United States Patent
Jung et al.

(10) Patent No.: US 12,406,335 B2
(45) Date of Patent: Sep. 2, 2025

(54) IMAGE ACQUISITION DEVICE AND METHOD OF CONTROLLING THE SAME

(71) Applicant: SAMSUNG ELECTRONICS CO., LTD., Suwon-si (KR)

(72) Inventors: Jaeho Jung, Suwon-si (KR); Yeultak Sung, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/484,979

(22) Filed: Oct. 11, 2023

(65) Prior Publication Data

US 2024/0037712 A1    Feb. 1, 2024

Related U.S. Application Data

(63) Continuation of application No. 17/728,535, filed on Apr. 25, 2022, now Pat. No. 11,810,279, which is a
(Continued)

(30) Foreign Application Priority Data

Dec. 26, 2017    (KR) .................. 10-2017-0180036
Dec. 26, 2018    (KR) .................. 10-2018-0169526

(51) Int. Cl.
*G06K 9/00*    (2022.01)
*G06T 5/50*    (2006.01)
(Continued)

(52) U.S. Cl.
CPC .................. *G06T 5/50* (2013.01); *G06T 5/77* (2024.01); *G06T 7/248* (2017.01);
(Continued)

(58) Field of Classification Search
CPC .. G06T 5/50; G06T 5/77; G06T 7/248; G06T 2207/20081; G06T 2207/20084;
(Continued)

(56) References Cited

U.S. PATENT DOCUMENTS 9,560,271 B2    1/2017    Na et al.
9,641,818 B1    5/2017    Sharma et al.
(Continued)

FOREIGN PATENT DOCUMENTS

CN    106127802 A    11/2016
CN    106204646 A    12/2016
(Continued)

OTHER PUBLICATIONS

Communication issued Nov. 13, 2023 by the Korean Intellectual Property Office in Korean Patent Application No. 10-2018-0169526.
(Continued)

*Primary Examiner* — Xin Jia
(74) *Attorney, Agent, or Firm* — Sughrue Mion, PLLC

(57) ABSTRACT

Provided is an artificial intelligence (AI) system that mimics functions, such as recognition and determination by human brains, by utilizing a machine learning algorithm, such as deep learning, and applications of the AI system. An image acquisition device is disclosed including a camera configured to acquire a first image, wherein a portion of a main object is hidden from the camera by a sub-object; at least one processor configured to input the first image to a first AI neural network; detect, by the first AI neural network from data corresponding to a plurality of objects included in the first image, first data corresponding to the main object and second data corresponding to the sub-object from the first image by inputting the first image to an AI neural network, remove the sub-object from the first image, and generate,
(Continued)

using a second AI neural network, a second image by restoring third data corresponding to at least a portion of the main object hidden by the removed sub-object by using the AI neural network, wherein the third data replaces the second data; and a display configured to display at least one of the first image and the second image.

17 Claims, 22 Drawing Sheets

Related U.S. Application Data continuation of application No. 16/232,711, filed on Dec. 26, 2018, now Pat. No. 11,328,396.

(51) Int. Cl.
G06T 5/77 (2024.01)
G06T 7/246 (2017.01)

(52) U.S. Cl.
CPC ............... *G06T 2207/20081* (2013.01); *G06T 2207/20084* (2013.01); *G06T 2207/20221* (2013.01)

(58) Field of Classification Search
CPC . G06T 2207/20221; G06T 5/60; G06T 5/005; G06T 5/00; G09G 2320/106; H04N 5/23222; H04N 5/23229; H04N 5/23254; H04N 5/23293; H04N 5/2621; H04N 5/2625; H04N 5/265
See application file for complete search history.

(56) References Cited

U.S. PATENT DOCUMENTS

| | | | |
|---|---|---|---|
| 2011/0103644 A1 | 5/2011 | Garten | |
| 2014/0022394 A1* | 1/2014 | Bae | G06T 7/248 348/169 |
| 2015/0022698 A1* | 1/2015 | Na | H04N 23/635 348/241 |
| 2015/0178591 A1 | 6/2015 | Fergus et al. | |
| 2016/0171669 A1 | 6/2016 | Abdollahian et al. | |
| 2017/0140236 A1 | 5/2017 | Price et al. | |
| 2017/0161592 A1 | 6/2017 | Su et al. | |
| 2017/0287137 A1* | 10/2017 | Lin | G06V 10/454 |
| 2019/0130229 A1* | 5/2019 | Lu | G06V 10/17 |

FOREIGN PATENT DOCUMENTS

| | | |
|---|---|---|
| EP | 3232371 A1 | 10/2017 |
| KR | 10-2015-0009184 A | 1/2015 |
| WO | 2017021322 A1 | 2/2017 |

OTHER PUBLICATIONS

Babaee, M., et al., "A deep convolutional neural network for video sequence background subtraction", 2018, Pattern Recognition, XP85329740, 15 pages total.
Chao Yang et al. "High-Resolution Image Inpainting Using Multi-scale Neural Patch Synthesis" 2017 IEEE Conference on Computer Vision and Pattern Recognition, Jul. 21-26, 2017 (pp. 4076-4084).
Communication dated Aug. 18, 2020, issued by the European Patent Office in counterpart European Application No. 18894837.6.
Communication dated Nov. 18, 2022, issued by the European Patent Office in counterpart European Application No. 22186911.8.
Communication issued Sep. 15, 2021 by the European Patent Office in European Patent Application No. 20190447.1.
Granados et al., "Background Inpainting for Videos with Dynamic Objects and a Free-Moving Camera," ECCV 2012, Part 1, LNCS 7572, pp. 682-695, 2012, XP047018591.
International Search Report and Written Opinion (PCT/ISA/210 and PCT/ISA/237), issued by International Searching Authority in corresponding International Application No. PCT/KR2018/016678, on Apr. 16, 2019.
Kumaar, Prabhu, "Thanks to Google Lens, Now AI gets a better Visual Cortex", May 22, 2017, https://www.linkedin.com/pulse/thanks-google-lens-now-ai-gets-better-visual-cortex-prabhu-kumaar-1, 3 pages total.
Lim, K., "Background Subtraction Using Encoder-Decoder Structured Convolutional Neural Network", 2017, IEEE, XP33233444, 6 pages total.
Nodari et al., "Digital Privacy: Replacing Pedestrians from Google Street View Images," 21st International Conference on Pattern Recognition (ICPR 2012), pp. 2889-2893, Nov. 2012, XP032329954.
Yang et al., "High-Resolution Image Inpainting using Multi-Scale Neural Patch Synthesis", Nov. 30, 2016, XP080735402.
Zhang et al., "Reference-guided exposure fusion in dynamic scenes," Journal of Visual Communication and Image Representation, vol. 23, No. 3, pp. 467-475, Jan. 2012, XP055977447.
Communication issued May 14, 2024 by the Korean Intellectual Property Office in the Korean Patent Application No. 10-2018-0169526.
Communication dated Aug. 20, 2024, issued by the Korean Intellectual Property Office in Korean Patent Application No. 10-2018-0169526.
Li He, "Computer Vision Recognition System for Component Defect Based on Neural Network", Computer Measurement & Control, Nov. 25, 2017, 5 pages, doi:10.16526/j.cnki.11-4762/tp.2017.11.063.
Communication issued Dec. 16, 2024 by the European Patent Office for EP Patent Application No. 22186911.8.
Communication issued on Nov. 4, 2024 by the Chinese Patent Office in corresponding CN Patent Application No. 202210122344.4.
European Extended Search Report issued Nov. 19, 2024 by the European Patent Office for EP Patent Application No. 24194460.2.
Communication issued Jun. 16, 2025 by the European Patent Office in European Patent Application No. 25165730.0.

* cited by examiner

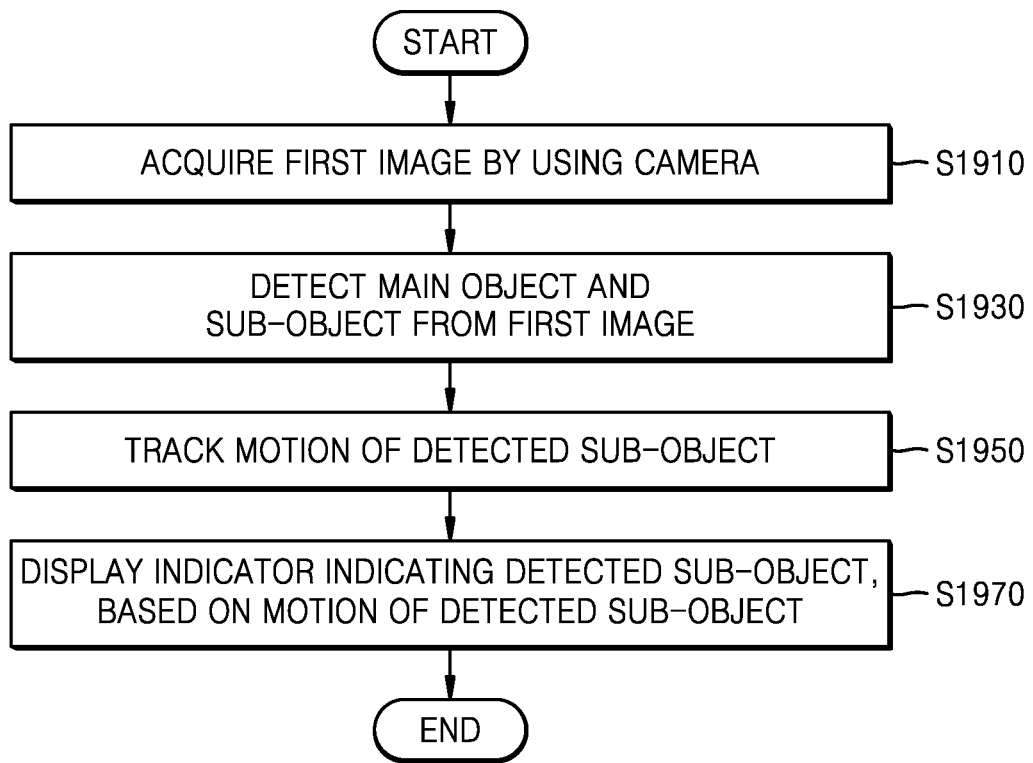
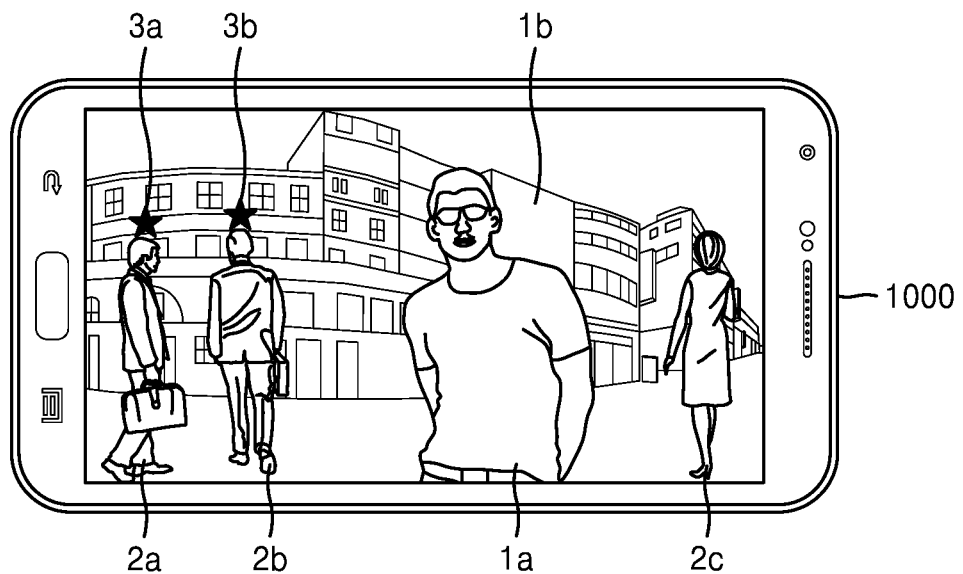

IMAGE ACQUISITION DEVICE AND METHOD OF CONTROLLING THE SAME

CROSS-REFERENCE TO RELATED APPLICATIONS

This is a continuation of U.S. application Ser. No. 17/728,535 filed Apr. 25, 2022, which is a Continuation application of U.S. application Ser. No. 16/232,711 filed on Dec. 26, 2018, which is based on and claims priority under 35 U.S.C. § 119 to Korean Patent Application No. 10-2017-0180036, filed on Dec. 26, 2017 and Korean Patent Application No. 10-2018-0169526, filed on Dec. 26, 2018, in the Korean Intellectual Property Office, the disclosures of which are incorporated by reference herein in their entirety.

BACKGROUND

1. Field

One or more embodiments relate to an image acquisition device and a method of controlling the same.

2. Description of Related Art

Artificial intelligence (AI) systems are computer systems configured to realize human-level intelligence and train themselves and make determinations spontaneously to become smarter, in contrast to existing rule-based smart systems. Since recognition rates of AI systems have improved and the AI systems more accurately understand a user's preferences the more they are used, existing rule-based smart systems are being gradually replaced by deep-learning AI systems.

AI technology includes machine learning (deep learning) and element technologies employing the machine learning.

The machine learning is algorithm technology that self-classifies/learns the characteristics of input data, and each of the element technologies is technology using a machine learning algorithm, such as deep learning, and includes technical fields, such as linguistic understanding, visual understanding, deduction/prediction, knowledge representation, and operation control.

Various fields to which AI technology is applied are as follows. Linguistic understanding is a technique of recognizing a language/character of a human and applying/processing the language/character of a human, and includes natural language processing, machine translation, a conversation system, questions and answers, voice recognition/synthesis, and the like. Visual understanding is a technique of recognizing and processing an object like in human vision, and includes object recognition, object tracking, image search, human recognition, scene understanding, space understanding, image improvement, and the like. Deduction/prediction is technology of logically performing deduction and prediction by determining information, and includes knowledge/probability-based deduction, optimization prediction, a preference-based plan, recommendation, and the like. Knowledge representation is a technique of automatically processing human experience information as knowledge data, and includes knowledge establishment (data generation/classification), knowledge management (data utilization), and the like. Operation control is a technique of controlling autonomous driving of a vehicle and motions of a robot, and includes motion control (navigation, collision avoidance, and driving), manipulation control (behavior control), and the like.

AI technology may also be used to acquire images, such as pictures or moving pictures.

SUMMARY

Provided is an image acquisition device that distinguishes a main object within an image from a sub-object within the image.

Provided is an image acquisition device that displays an image such that a user may easily recognize a sub-object within an image.

Provided is an image acquisition device that removes a sub-object from an image and displays an image from which the sub-object has been removed.

Provided is an image acquisition device that acquires an image in which at least a portion of a main object hidden by a sub-object has been restored.

Additional aspects will be set forth in part in the description which follows and, in part, will be apparent from the description, or may be learned by practice of the presented embodiments.

In accordance with an aspect of this disclosure, a method is provided of acquiring an image by using an artificial intelligence (AI) neural network, the method including: acquiring a first image by using a camera, wherein a portion of a main object is hidden from the camera by a sub-object; inputting the first image to a first AI neural network; detecting, by the first AI neural network, from data corresponding to a plurality of object included the first image, first data corresponding to the main object and second data corresponding to the sub-object; removing the second data corresponding to the sub-object from the first image; and generating, using a second AI neural network, a second image by restoring third data corresponding to at least a portion of the main object hidden by the sub-object, wherein the third data replaces the second data.

In some embodiments of the method, the detecting of the first data corresponding to the main object and the second data corresponding to the sub-object comprises displaying an indicator indicating the second data corresponding to the sub-object together with the first image.

In some embodiments of the method, the restoring of the third data corresponding to the at least the portion of the main object comprises: acquiring information of first relative locations between the camera and the main object; and restoring the third data corresponding to the at least the portion of the main object, based on the information of the first relative locations.

In some embodiments, the method includes determining a first sharpness of the third data corresponding to the at least the portion of the main object; and performing image processing such that a second sharpness of the third data corresponding to the at least the portion of the main object corresponds to the first sharpness.

In some embodiments of the method, the detecting of the first data corresponding to the main object and the second data corresponding to the sub-object comprises: receiving a user selection of the sub-object from the first image; and detecting the second data corresponding to the sub-object from the first image, based on the user selection.

In some embodiments of the method, the displaying of the indicator includes: tracking a motion of the sub-object; and displaying the indicator, based on the motion of the sub-object.

In some embodiments of the method, the tracking of the motion of the sub-object includes: acquiring information of second relative locations between the camera and the sub-object; inputting the information of the second relative locations to the first AI neural network; and tracking, by the first AI neural network, the motion of the sub-object by detecting a change in the information of the second relative locations.

In some embodiments of the method, the detecting of the first data corresponding to the main object and the second data corresponding to the sub-object includes: forming, in response to a user input of driving the camera, a communication link with a server, wherein the server includes the first AI neural network and the second AI neural network; transmitting, over the communication link, the first image to the server; and receiving, from the server over the communication link, information about a result of detecting the first data corresponding to the main object and the second data corresponding to the sub-object.

In some embodiments, the method includes receiving, from a server and in response to a user input of driving the camera, data for updating at least one of the first AI neural network and the second AI neural network.

In some embodiments of the method, the first AI neural network is a model trained to detect the first data corresponding to the main object by using at least one pre-stored image as learning data.

In accordance with an aspect of this disclosure, a image acquisition device is provided.

In some embodiments, the image acquisition device includes a camera configured to acquire a first image, wherein a portion of a main object is hidden from the camera by a sub-object. In some embodiments, the image acquisition device also includes at least one processor configured to: input the first image to a first AI neural network; detect, by the first AI neural network from data corresponding to a plurality of object included the first image, first data corresponding to the main object and second data corresponding to the sub-object, and generate, using a second AI neural network, a second image by restoring third data corresponding to at least a portion of the main object hidden by the sub-object, wherein the third data replaces the second data. The image acquisition device also includes a display configured to display at least one of the first image and the second image.

In some embodiments of the image acquisition device, the display is further configured to display an indicator indicating the second data corresponding to the sub-object, together with the first image.

In some embodiments of the image acquisition device, the at least one processor is further configured to: acquire information of first relative locations between the camera and the main object; and restore the third data corresponding to the at least a portion of the main object, based on the information of the first relative locations.

In some embodiments of the image acquisition device, the at least one processor is further configured to: determine a first sharpness of the third data corresponding to the at least portion of the main object; and perform image processing such that a second sharpness of the third data corresponding to the at least portion of the main object corresponds to the first sharpness.

In some embodiments, the image acquisition device also includes a user input interface configured to receive user selection of the sub-object from the first image, wherein the at least one processor is further configured to detect the second data corresponding to the sub-object, based on the user selection.

In some embodiments of the image acquisition device, the at least one processor is further configured to track a motion of the sub-object, and the display is further configured to display the indicator, based on the motion of the sub-object.

In some embodiments of the image acquisition device, the at least one processor is further configured to acquire information of second relative locations between the camera and the sub-object; input the information of the second relative locations to the first AI neural network; and track the motion of the sub-object by detecting a change in the information of the second relative locations.

In some embodiments, the image acquisition device also includes a user input interface configured to receive a user input of driving the camera. In some embodiments, the image acquisition device also includes a communication interface configured to: form, in response to the user input, a communication link with a server including the first AI neural network and the second AI neural network, transmit the first image to the server, and receive, from the server, information about a result of detecting the first data corresponding to the main object and the second data corresponding to the sub-object from the first image.

In some embodiments, the image acquisition device also includes a user input interface configured to receive a user input of driving the camera. In some embodiments, the image acquisition device also includes a communication interface configured to: form, in response to the user input, a communication link with a server that updates at least one of the first AI neural network and the second AI neural network and receive, over the communication link, data for updating at least one of the first AI neural network and the second AI neural network from the server.

In some embodiments of the image acquisition device, the first AI neural network is a model trained to detect the first data corresponding to the main object by using at least one pre-stored image as learning data.

In accordance with yet another aspect of the disclosure, a method of acquiring an image by using an artificial intelligence (AI) neural network includes acquiring a first image by using a camera; detecting a main object and a sub-object from the first image by inputting the first image to the AI neural network; removing the sub-object from the first image; and generating a second image by restoring at least a portion of the main object hidden by the removed sub-object, by using the AI neural network.

In accordance with yet another aspect of the disclosure, an image acquisition device includes a camera configured to acquire a first image; at least one processor configured to detect a main object and a sub-object from the first image by inputting the first image to an AI neural network, remove the sub-object from the first image, and generate a second image by restoring at least a portion of the main object hidden by the removed sub-object by using the AI neural network; and a display configured to display at least one of the first image and the second image.

In accordance with yet another aspect of the disclosure, a computer program product including a non-transitory computer-readable storage medium has recorded thereon a method of acquiring an image by using an AI neural network, the non-transitory computer-readable storage medium including instructions to acquire a first image by using a camera; detect a main object and a sub-object from the first image by inputting the first image to the AI neural network; remove the sub-object from the first image; and generate a second image by restoring at least a portion of the main object hidden by the removed sub-object, by using the AI neural network.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 19 is a flowchart of a method of tracking a motion of a sub-object within an image, according to some embodiments;

FIGS. 20, 21, 22, and 23 are views illustrating examples of tracking a motion of a sub-object within an image, according to some embodiments;

DETAILED DESCRIPTION

Figure 1:
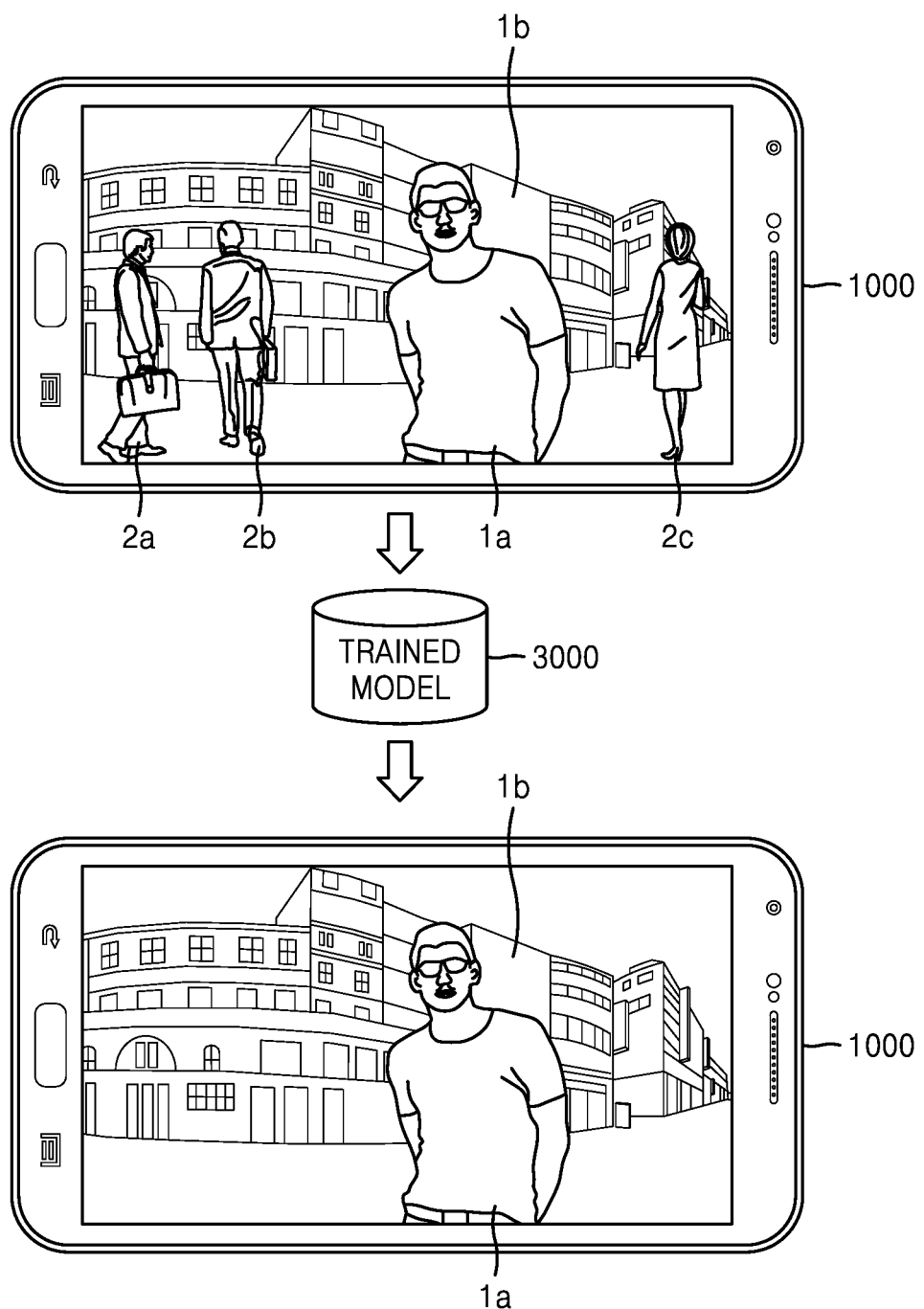
FIG. 1 illustrates an example in which an image acquisition device acquires an image, according to some embodiments.

Embodiments of the present disclosure are described in detail herein with reference to the accompanying drawings so that this disclosure may be easily performed by one of ordinary skill in the art to which the present disclosure pertains. The disclosure may, however, be embodied in many different forms and should not be construed as being limited to the embodiments set forth herein. In the drawings, parts irrelevant to the description are omitted for simplicity of explanation, and like numbers refer to like elements throughout.

The aforementioned embodiments may be described in terms of functional block components and various processing steps. Some or all of such functional blocks may be realized by any number of hardware and/or software components configured to perform the specified functions. For example, functional blocks according to the disclosure may be realized by one or more microprocessors or by circuit components for a predetermined function. In addition, for example, functional blocks according to the disclosure may be implemented with any programming or scripting language. The functional blocks may be implemented in algorithms that are executed on one or more processors. Furthermore, the disclosure described herein could employ any number of conventional techniques for electronics configuration, signal processing and/or control, data processing and the like. The words "mechanism," "element," "means," and "configuration" are used broadly and are not limited to mechanical or physical embodiments, Throughout the specification, when an element is referred to as being "connected" or "coupled" to another element, it can be directly connected or coupled to the other element, or can be electrically connected or coupled to the other element with intervening elements interposed therebetween. In addition, the terms "comprises" and/or "comprising" or "includes" and/or "including" when used in this specification, specify the presence of stated elements, but do not preclude the presence or addition of one or more other elements.

Furthermore, the connecting lines or connectors between components shown in the various figures presented are intended to represent exemplary functional relationships and/or physical or logical couplings between the components. Connections between components may be represented by many alternative or additional functional relationships, physical connections or logical connections in a practical device.

While such terms as "first," "second," etc., may be used to describe various components, such components must not be limited to the above terms. The above terms are used only to distinguish one component from another.

A main object used herein means an object that a user of an image acquisition device 1000 desires to include in an image, and a sub-object used herein means an object that the user does not desire to include in an image.

The disclosure will now be described more fully with reference to the accompanying drawings, in which exemplary embodiments of the disclosure are shown.

FIG. 1 illustrates an example in which the image acquisition device 1000 acquires an image, according to some embodiments.

Referring to FIG. 1, the image acquisition device 1000 may acquire an image by using a camera included in the image acquisition device 1000. In the example of FIG. 1, objects 1a, 1b, 2a, 2b, and 2c are in a field of view of the camera. In the example of FIG. 1, object 1b is a building and objects 2a, 2b, 2c and 1b are people. Portions of the building 1b are not visible to the camera because they are hidden behind objects 2a, 2b, 2c, and 1a. The image acquired by the image acquisition device 1000 may include main objects 1a and 1b and sub-objects 2a, 2b, and 2c.

When needed for clarity, the three-dimensional object in the field of view of the camera will be distinguished from an image of the three-dimensional object captured by the camera. The three-dimensional thing in the field of view may be referred to directly as the object while the image of the object may be referred to as data corresponding to the object. For example, the building 1b is an object in the field of view of the camera. The portion of an image representing the building 1b may be referred to as data corresponding to the building 1b. When there is not a risk of confusion when discussing the content of an image, the data representing an object may be referred to as the object in the image, or the like.

The image acquisition device 1000 may detect the main objects 1a and 1b and the sub-objects 2a, 2b, and 2c from the acquired image. The image acquisition device 1000 may remove the sub-objects 2a, 2b, and 2c from the image. In some embodiments, removal of a sub-object may be achieved by replacing the data associated with the sub-object with default data representing a blank screen. The removal of the sub-objects 2a, 2b, and 2c from the image, in some embodiments, is based on a result of the detection of the main objects 1a and 1b and the sub-objects 2a, 2b, and 2c. The image acquisition device 1000 may restore at least a portion of the main object 1b hidden by the sub-objects 2a, 2b, and 2c, thereby acquiring an image. For example, in the lower portion of FIG. 1 showing the image acquisition device 1000 with a second image, after removal of the sub-objects 2a, 2b, and 2c, the building 1b now appears complete and continuous behind the object 1a. For example, a complete vertical line marking a corner of the building 1b, formerly partially hidden by the object 2c, now appears complete to a viewer of the image.

The image acquired by the image acquisition device 1000 may include a final image that is to be stored in the image acquisition device 1000, and a preview image that is displayed on the image acquisition device 1000 in order to obtain the final image.

The image acquisition device 1000 may detect at least one of the main objects 1a and 1b and the sub-objects 2a, 2b, and 2c from the acquired image by using a trained model 3000. The image acquisition device 1000 may restore at least a portion of the main object 1b hidden by the sub-objects 2a, 2b, and 2c, by using the trained model 3000. After the restoration of the hidden part of the object 1b, a cumulative effect to a viewer of the image is that of a complete and continuous representation of the object 1b including the portion that was previously hidden by one or more of the sub-objects.

The trained model 3000 may include a plurality of trained models. In other words, the trained models corresponding to each of the various uses can be collectively referred to as the trained model 3000. For example, the trained model 3000 includes a first trained model for detecting at least one of the main objects 1a and 1b and detecting at least one of the sub-objects 2a, 2b, and 2c among the plurality of objects included in the image and a second trained model for restoring at least a portion of the main object 1b hidden by the sub-objects 2a, 2b and 2c. Hereinafter, various trained models for implementing the disclosed embodiments are collectively described as a trained model 3000.

The trained model 3000 may be established considering, for example, an application field of a recognition model, a purpose of learning, or the computer performance of a device. The trained model 3000 may include, for example, a model based on an AI neural network. For example, a model, such as a deep neural network (DNN), a recurrent neural network (RNN), or a bidirectional recurrent DNN (BRDNN), and Generative Adversarial Networks (GAN) may be used as the trained model 3000, but embodiments are not limited thereto.

According to an embodiment, the trained model 3000 may learn learning data according to a preset standard in order to detect at least one of the main objects 1a and 1b and the sub-objects 2a, 2b, and 2c from the acquired image. For example, the trained model 3000 may detect at least one of the main objects 1a and 1b and the sub-objects 2a, 2b, and 2c by performing supervised learning, unsupervised learning, and reinforcement learning with respect to the learning data. The trained model 3000 may detect at least one of the main objects 1a and 1b and the sub-objects 2a, 2b, and 2c from the acquired image by learning the learning data according to DNN technology.

According to an embodiment, the trained model 3000 may learn the learning data according to a preset standard in order to restore at least a portion of the main object 1b hidden by the sub-objects 2a, 2b, and 2c. For example, the trained model 3000 may restore at least a portion of the main object 1b hidden by the sub-objects 2a, 2b, and 2c by performing supervised learning, unsupervised learning, and reinforcement learning with respect to the learning data. The trained model 3000 may restore at least a portion of the main object 1b hidden by the sub-objects 2a, 2b, and 2c, by learning the learning data according to DNN technology.

According to an embodiment, the user may acquire at least one of the preview image and the final image, as an image including only main objects.

Figure 2:
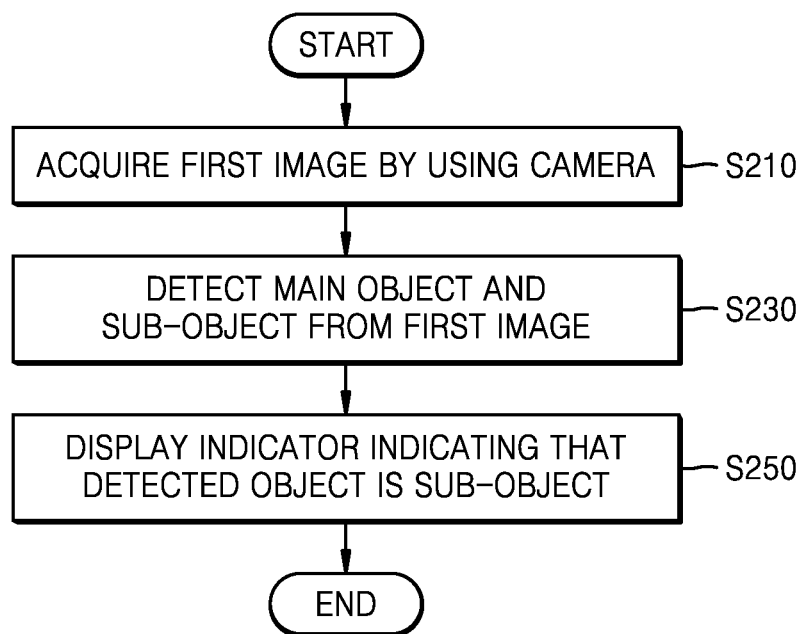
FIG. 2 is a flowchart of a method, performed by the image acquisition device, of acquiring an image, according to some embodiments.
Figure 3:
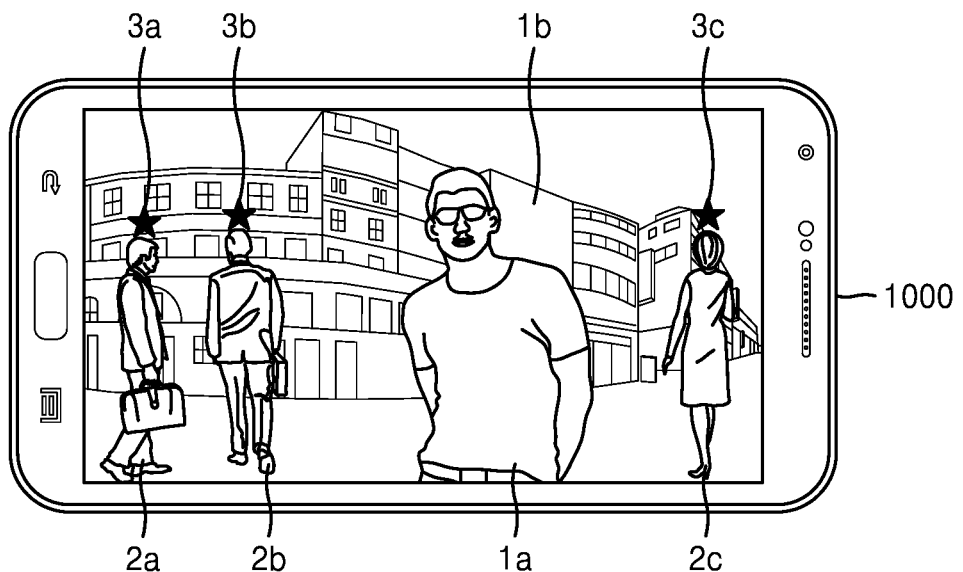
FIGS. 3, 4 and 5 are views illustrating examples of displaying an indicator indicating a sub-object, according to some embodiments.
Figure 4:
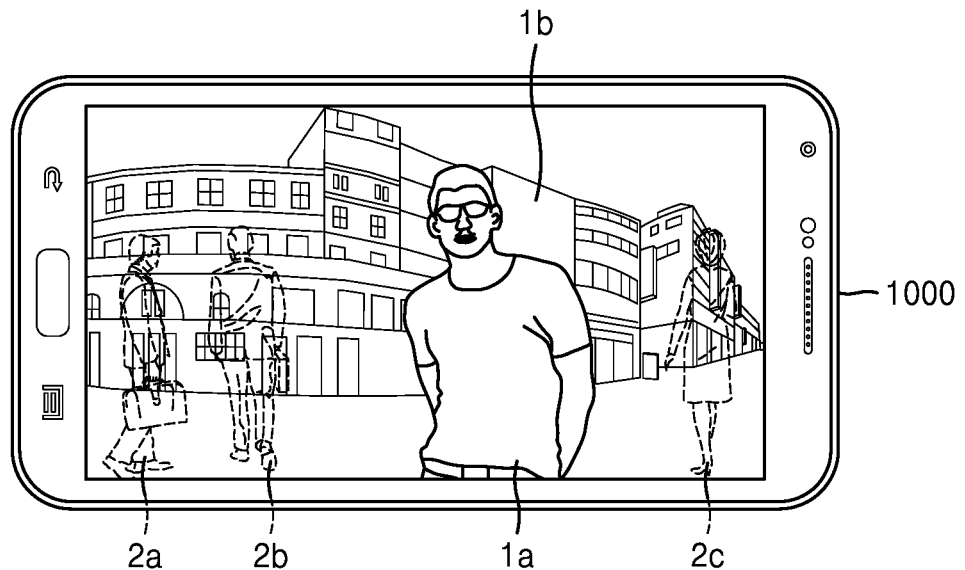
Figure 5:
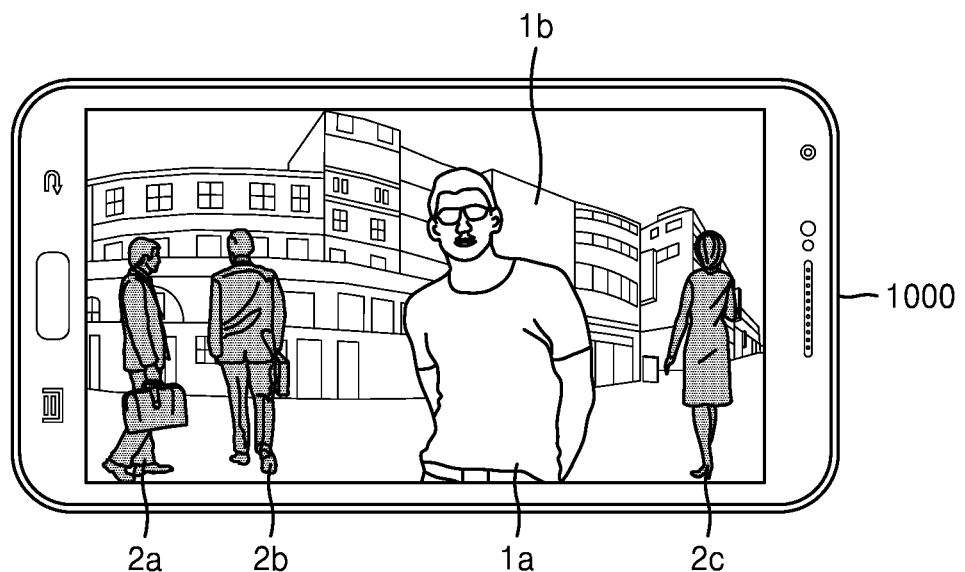

FIG. 2 is a flowchart of a method, performed by the image acquisition device 1000, of acquiring an image, according to some embodiments. FIGS. 3 through 5 are views illustrating examples of displaying an indicator indicating a sub-object, according to some embodiments.

Referring to FIG. 2, in operation S210 the image acquisition device 1000 may acquire a first image by using the camera. In general the camera captures light from three-dimensional objects in the field of view of the camera and records two-dimensional images consisting of data corresponding to the three-dimensional objects. In operation S230, the flowchart of FIG. 2 illustrates that the image acquisition device 1000 may detect at least one of a main object and a sub-object from the first image. Specifically, this may be referred to as detecting first data corresponding to the main object and detecting second data corresponding to the sub-object. However, generally, the data in the image may be referred to directly as the object when there is no risk of confusion. In operation S250, the flowchart of FIG. 2 illustrates that the image acquisition device 1000 may display an indicator indicating the detected sub-object.

According to an embodiment, the image acquisition device 1000 may acquire the first image by using the camera included in the image acquisition device 1000. Alternatively, the image acquisition device 1000 may acquire an image from an external camera connected to the image acquisition device 1000 according to at least one of a wired manner and a wireless manner. The first image acquired by the camera may include a preview image for acquiring a final image that is to be stored in the image acquisition device 1000. The preview image may be displayed on a display of the image acquisition device 1000 or may be displayed on an external display connected to the image acquisition device 1000 according to at least one of a wired manner and a wireless manner.

In operation S230, the image acquisition device 1000 may detect a main object and a sub-object from the first image. The main object may include an object that the user of the image acquisition device 1000 desires to include in the final image. The sub-object may also include another object that the user does not desire to include in the final image.

Referring to FIGS. 3 through 5, the image acquisition device 1000 may detect the main objects 1a and 1b and the sub-objects 2a, 2b, and 2c from the first image.

According to an embodiment, the main object 1a may include a human. For example, the main object 1a may include the user of the image acquisition device 1000. Alternatively, the main object 1a may include a person associated with the user of the image acquisition device 1000. In detail, the main object 1a may include a family member, a lover, or a relative of the user of the image acquisition device 1000.

According to an embodiment, the main object 1b may include a building, a sculpture, and/or a natural landscape. For example, the main object 1b may include a landmark of a region where the image acquisition device 1000 is located. As another example, the main object 1b may include a sculpture located around or near the image acquisition device 1000. As another example, the main object 1b may include natural landscapes, such as the sky, lawn, a lake, and/or the sea.

According to an embodiment, the sub-objects 2a, 2b, and 2c may include people. For example, the sub-objects 2a, 2b, and 2c may include humans located near the user. In detail, the sub-objects 2a, 2b, and 2c may include a passerby passing near the user, a person who is taking a picture with the main object 1b as a background, and a person who is selling something near the user. In general, the persons included in the sub-objects 2a, 2b, and 2c may be unrelated to the user, but embodiments are not limited thereto.

According to an embodiment, a sub-object may include a specific object. For example, a sub-object may include at least one object that hides the main object 1b or a portion of the main object 1b within the first image. For example, when a sub-object in the field of view blocks some light from the main object 1b reaching the camera, this blockage of light means that part of the main object 1b is hidden from the camera by the sub-object. Because of the blockage of light, data that is present in the image captured by the camera is incomplete in the sense that portions of the main object 1b are not visible in the image captured by the camera. As examples, a sub-object may include objects, such as a tree, a trash can, a newsstand, a wall, and a barbed-wire fence, that hide the main object 1b, but embodiments are not limited thereto.

According to an embodiment, the main objects 1a and 1b and the sub-objects 2a, 2b, and 2c may be detected from the first image by inputting the first image to an AI neural network. For example, the AI neural network may detect various portions of data within the first image, the various portions of data corresponding respectively to the different sub-objects. For example, the image acquisition device 1000 may input the first image to the AI neural network, and the AI neural network may detect at least one of the main objects 1a and 1b and the sub-objects 2a, 2b, and 2c from the first image, based on a result of learning the learning data.

According to an embodiment, the AI neural network may learn by using at least one image stored in the image acquisition device 1000 as the learning data. For example, the AI neural network may use, as the learning data, an image including the face of the user and images including the faces of people associated with the user, wherein the images are stored in the image acquisition device 1000.

In many cases, the user of the image acquisition device 1000 takes pictures including his or her face and the faces of people associated with the user. Accordingly, a plurality of images each including the face of the user and a plurality of images each including people (family members, a lover, and relatives) associated with the user may be stored in the image acquisition device 1000. Accordingly, when the AI neural network learns, as the learning data, at least one image stored in the image acquisition device 1000, the AI neural network may detect at least one of the user and the people associated with the user, as the main object 1a.

The image acquisition device 1000 may store a plurality of images each associated with a specific region where the user is located. When the user wants to travel to a specific region, the user generally searches for materials associated with the region on the Internet, and stores images associated with the region in the image acquisition device 1000. In particular, the user generally stores images associated with major buildings, sculptures, and natural landscapes of the specific region in the image acquisition device 1000. Accordingly, when the AI neural network learns, as the learning data, at least one image stored in the image acquisition device 1000, the AI neural network may detect at least one of the major buildings, the sculptures, and the natural landscapes of the specific region where the user is located, as the main object 1b.

According to an embodiment, the AI neural network may learn by using at least one image disclosed on the Internet as the learning data. For example, the AI neural network may use an image disclosed on the Internet and associated with the specific region, as the learning data. When the user wants to travel to a specific region, the user may search for images associated with the specific region on the Internet. The AI neural network may detect a building, a sculpture, and/or a natural landscape of the specific region where the user is located, as the main object 1b. The AI neural network may perform the detection by learning, as the learning data, images associated with the specific region found by the user on the Internet.

The AI neural network may use images disclosed on the Internet and associated with general objects, as the learning data. The AI neural network may use a plurality of images disclosed on the Internet, as the learning data, in order to recognize general objects (e.g., a tree, a trash can, a streetlamp, traffic lights, a stall, a human, and an animal) within an image. The AI neural network may detect the sub-objects 2a, 2b, and 2c from the first image by learning, as the learning data, the images associated with the general objects disclosed on the Internet.

In operation S250, the image acquisition device 1000 may display an indicator indicating that a detected object is a sub-object. For example, the image acquisition device 1000 may display both the first image and an indicator indicating a sub-object, on the display included in the image acquisition device 1000. Alternatively the image acquisition device 1000 may display both the first image and an indicator indicating a sub-object on the external display connected to the image acquisition device 1000, wherein the connection may be a wired connection or a wireless connection.

Referring to FIGS. 3 through 5, the image acquisition device 1000 may display an indicator indicating a sub-object according to various methods.

According to an embodiment, the image acquisition device 1000 may display indicators 3a, 3b, and 3c near the sub-objects 2a, 2b, and 2c, as shown in FIG. 3. In detail, the image acquisition device 1000 may display indicators 3*a*, 3*b*, and 3*c* each shaped as a star, near the sub-objects 2*a*, 2*b*, and 2*c*. One of ordinary skill in the art will recognize that an indicator may be displayed in various shapes.

According to an embodiment, the image acquisition device 1000 may display an indicator indicating a sub-object, by indicating the sub-objects 2*a*, 2*b*, and 2*c* in dashed lines, as shown in FIG. 4. For example, the image acquisition device 1000 may display the sub-objects 2*a*, 2*b*, and 2*c* by outlining the sub-objects 2*a*, 2*b*, and 2*c* in dashed lines. As another example, the image acquisition device 1000 may display the sub-objects 2*a*, 2*b*, and 2*c* in semi-transparent dashed lines such that at least a portion of the main object 1*b* hidden by the sub-objects 2*a*, 2*b*, and 2*c* is displayed within the sub-objects 2*a*, 2*b*, and 2*c*.

According to an embodiment, the image acquisition device 1000 may display an indicator indicating a sub-object by overlaying at least respective portions of the sub-objects 2*a*, 2*b*, and 2*c* with at least one of a preset color and a preset pattern, as shown in FIG. 5.

Figure 6:
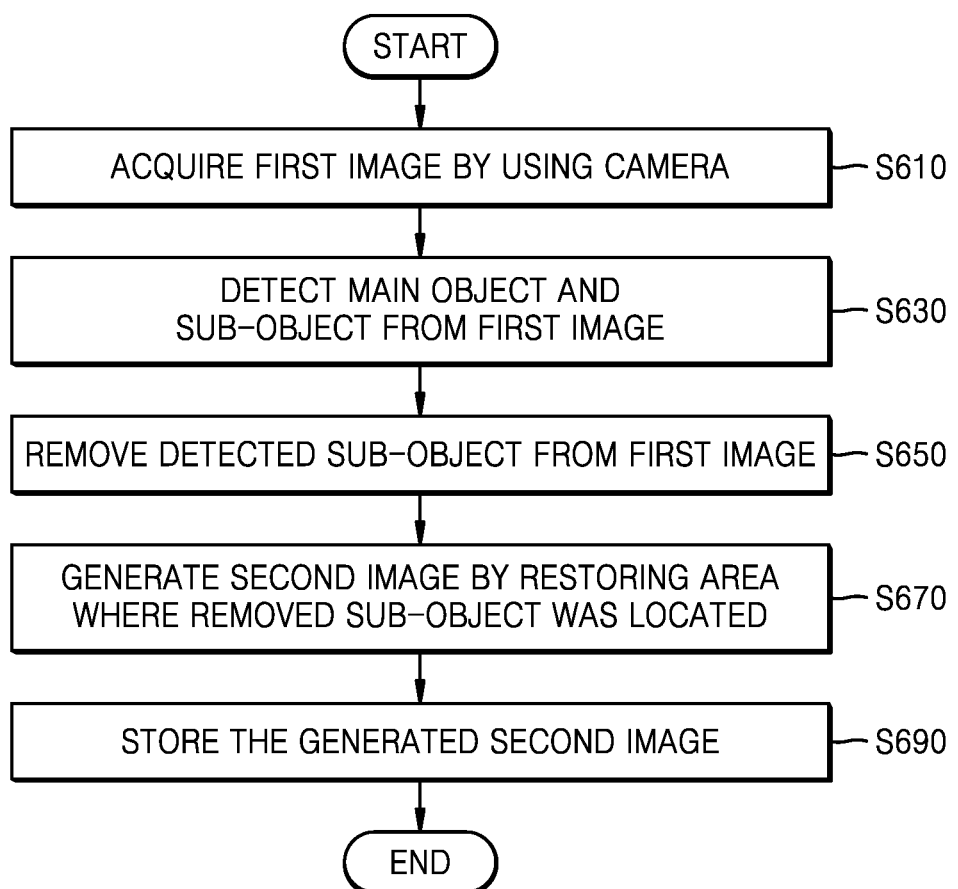
FIG. 6 is a flowchart of a method of restoring at least a portion of a main object hidden by a sub-object, according to some embodiments.

FIG. 6 is a flowchart of a method of restoring at least a portion of a main object hidden by a sub-object, according to some embodiments. FIGS. 7 through 11 illustrate examples of restoring at least a portion of a main object hidden by a sub-object, according to some embodiments.

Referring to FIG. 6, the image acquisition device 1000 may acquire the first image by using the camera, in operation S610, detect at least one of a main object and a sub-object from the first image, in operation S630, remove the detected sub-object from the first image, in operation S650, generate a second image by restoring an area where the removed sub-object was located, in operation S670, and store the generated second image, in operation S690.

Operation S610 is similar to operation S210, and thus a redundant description thereof will be omitted.

Operation S630 is similar to operation S230, and thus a redundant description thereof will be omitted.

In operation S650, the image acquisition device 1000 may remove the detected sub-object from the first image. In some embodiments removing the detected sub-object corresponds to identifying data within the image to be overwritten by a second image.

Figure 7:
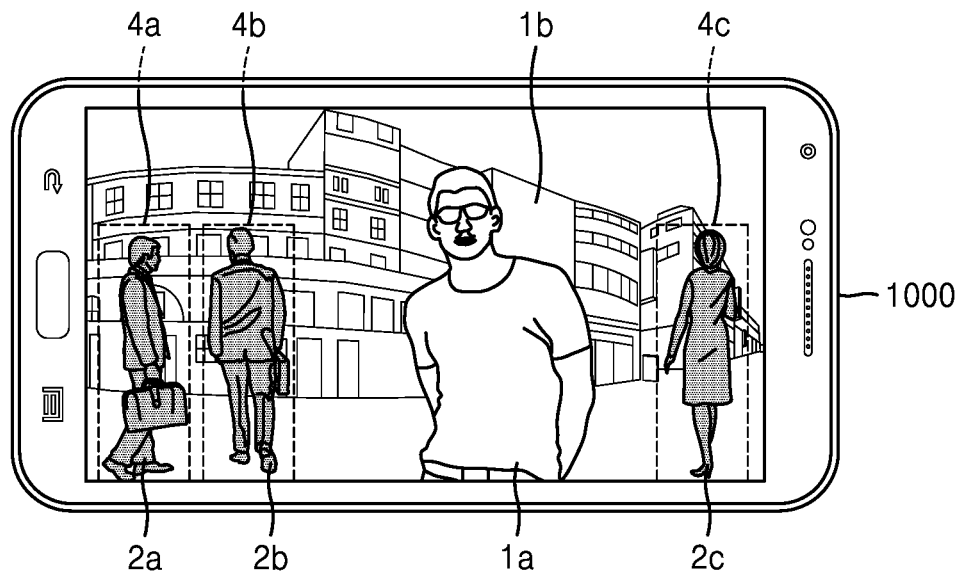
FIGS. 7, 8, 9, 10, and 11 illustrate examples of restoring at least a portion of a main object hidden by a sub-object, according to some embodiments.
Figure 8:
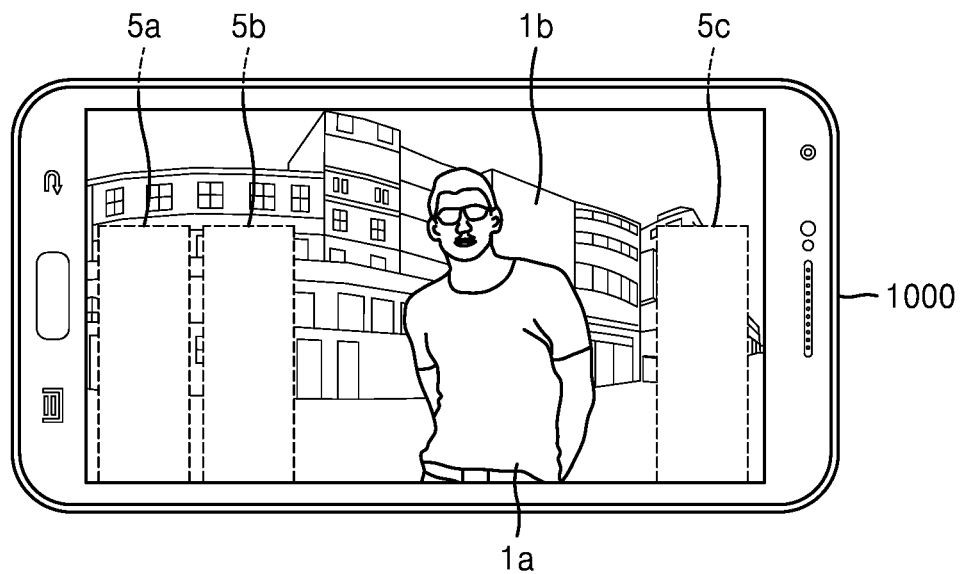

According to an embodiment, as shown in FIG. 7, the image acquisition device 1000 may remove, from the first image, data associated with at least some areas of the first image where the detected sub-objects 2*a*, 2*b*, and 2*c* are located. In detail, the image acquisition device 1000 may remove only data associated with the sub-objects 2*a*, 2*b*, and 2*c* from the first image. Alternatively, as shown in areas 5*a*, 5*b*, and 5*c* of FIG. 8, the image acquisition device 1000 may remove, from the first image, data associated with areas 4*a*, 4*b*, and 4*c* including the sub-objects 2*a*, 2*b*, and 2*c*. The image acquisition device 1000 may display or not display an image from which data associated with a sub-object has been removed.

According to an embodiment, the image acquisition device 1000 may remove, from the first image, the data associated with the at least some areas of the first image where the sub-objects 2*a*, 2*b*, and 2*c* are located, by using the AI neural network. The AI neural network may detect an area associated with a sub-object such that restoration is efficiently performed, and remove the detected area, by learning as the learning data a partially-removed image and an image in which a removed portion has been restored.

In operation S670, the image acquisition device 1000 may restore the at least some areas of the first image from which data has been removed. In some embodiments, restoration of removed data corresponds to replacing removed data with other data, where the other data corresponds to part of an object, for example a part of a building, that was hidden from the camera at the time the first image was captured.

Figure 9:
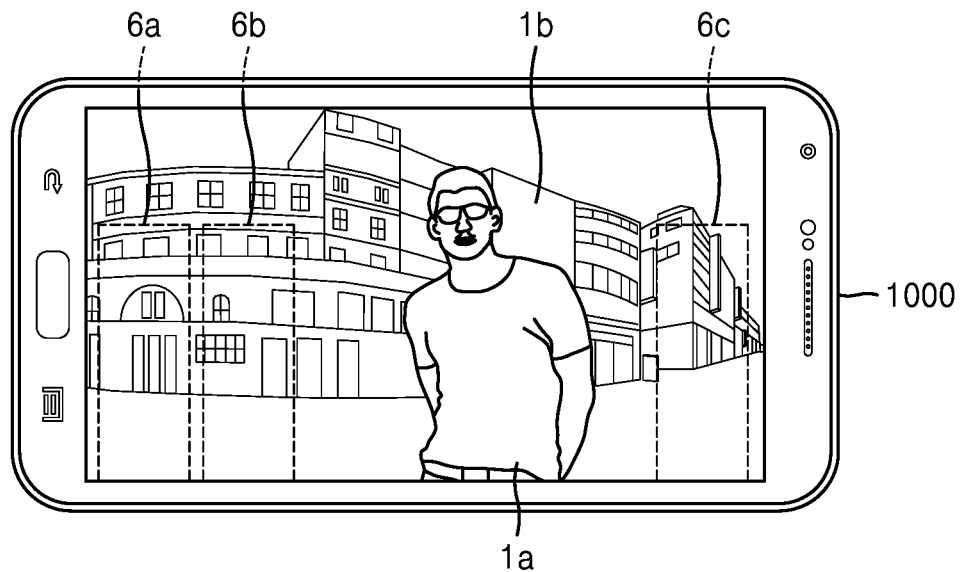

According to an embodiment, the image acquisition device 1000 may restore the areas 5*a*, 5*b*, and 5*c* from which data has been removed, such that at least a portion of the main object 1*b* hidden by the sub-objects 2*a*, 2*b*, and 2*c* is included. Referring to FIG. 9, the image acquisition device 1000 may restore the areas 5*a*, 5*b*, and 5*c* from which data has been removed, such that the at least portion of the main object 1*b* is included, thereby obtaining restored areas 6*a*, 6*b*, and 6*c*.

According to an embodiment, the image acquisition device 1000 may restore an area from which data has been removed, such that the at least portion of the main object 1*b* is included, by using the AI neural network. For example, the AI neural network may restore an area such that the at least portion of the main object 1*b* is included, by learning, as the learning data, at least one image associated with the main object 1*b*. In detail, the AI neural network may learn, as the learning data, at least one image stored in the image acquisition device 1000 and associated with the main object 1*b*. The AI neural network may learn at least one image disclosed on the Internet and associated with the main object 1*b*, as the learning data. The AI neural network may learn images associated with general objects, as the learning data. The AI neural network may generate a second image by restoring a data-removed area such that the at least portion of the main object 1*b* is included, by using a model such as a generative adversarial network (GAN).

According to an embodiment, the image acquisition device 1000 may restore the data-removed area such that sharpness of a restored area corresponds to sharpness of the vicinity of the restored area. Sharpness corresponds to a subjective perception that is related to the edge contrast of an image. The image acquisition device 1000 may acquire a first image in which the main object 1*a* is "in focus" and the main object 1*b* is "out of focus," e.g., a first sharpness." In this case, the main object 1*a* in focus may be clear, and the main object 1*b* out of focus may be unclear, such as, blurred. The image acquisition device 1000 may restore the data-removed area such that the sharpness of the restored area, e.g., a second sharpness, corresponds to sharpness, in this example, blurry because out of focus, e.g., a first sharpness, of the main object 1*b* included in the first image.

According to an embodiment, in order to restore the data-removed area such that the sharpness of the restored area corresponds to the sharpness of the vicinity of the restored area, the image acquisition device 1000 may determine the sharpness of the main object 1*b* included in the restored area to correspond to the sharpness of the main object 1*b* included in the first image. The image acquisition device 1000 may additionally perform image processing such that the sharpness of the main object 1*b* included in the restored area corresponds to the sharpness of the main object 1*b* included in the first image.

Figure 10:
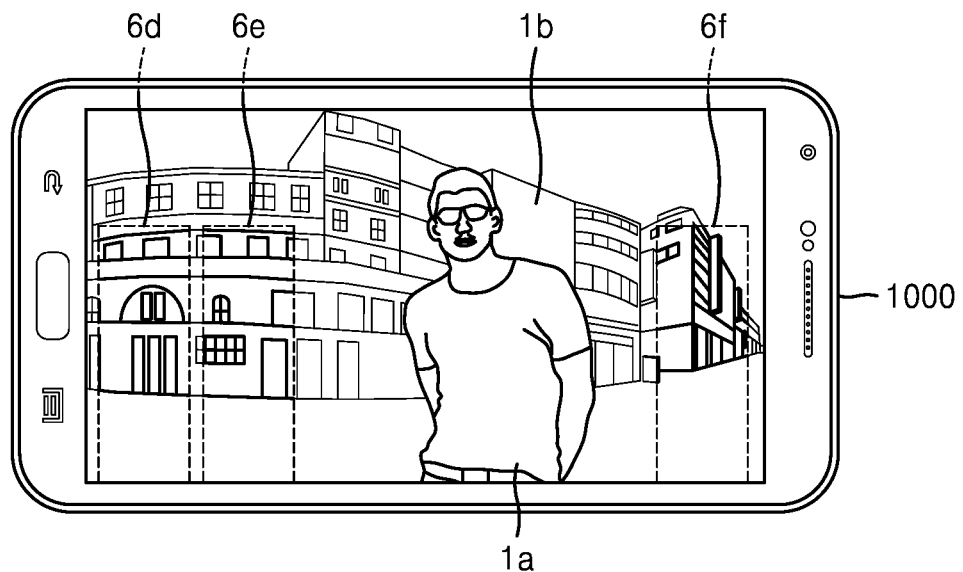
Figure 11:
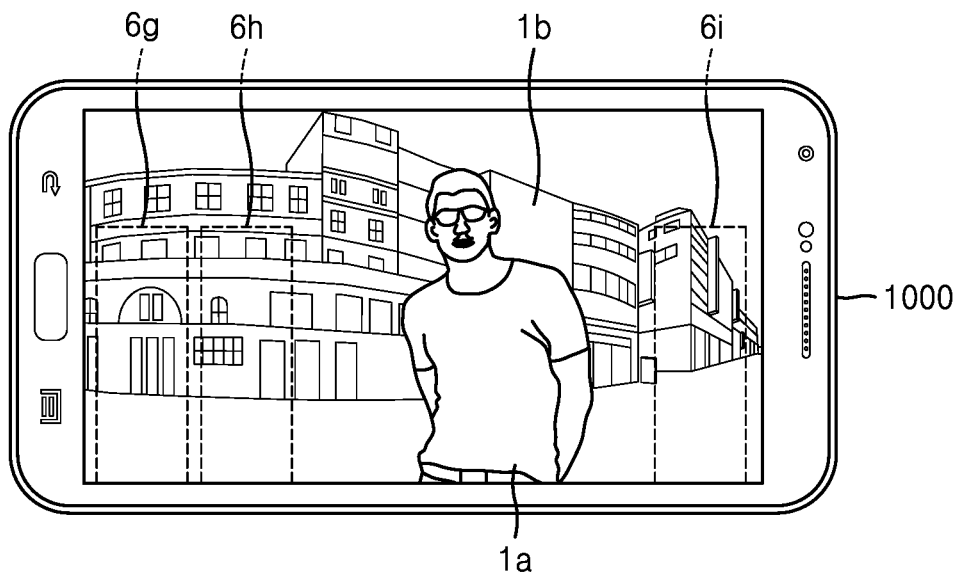

Referring to FIG. 10, the areas of the main object 1*b* included in restored areas 6*d*, 6*e*, and 6*f* may be clearer than the vicinity of the restored areas 6*d*, 6*e*, and 6*f*. Referring to FIG. 11, the image acquisition device 1000 may perform image processing such that sharpness of a clearly restored area as in FIG. 10 corresponds to the sharpness of the vicinity of the restored area. For example, the image acquisition device 1000 may perform image processing for lowering the sharpness of the main object 1*b* included in the restored areas 6*d*, 6*e*, and 6*f*. Sharpness of the main object 1b included in image-processing-completed areas 6g, 6h, and 6i may correspond to the sharpness of the main object 1b included in the first image.

Figure 12:
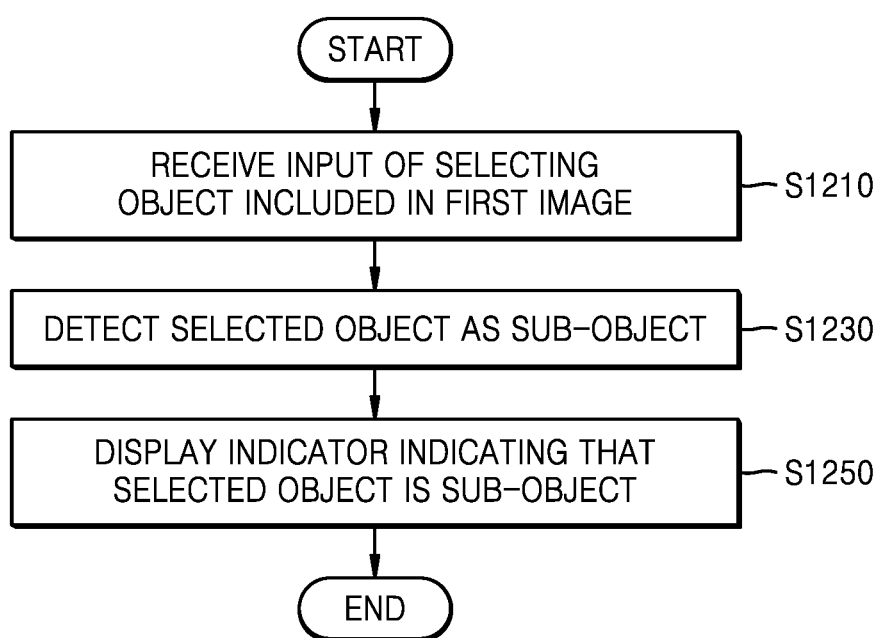
FIG. 12 is a flowchart of a method of detecting a sub-object in response to a user input, according to some embodiments.
Figure 13:
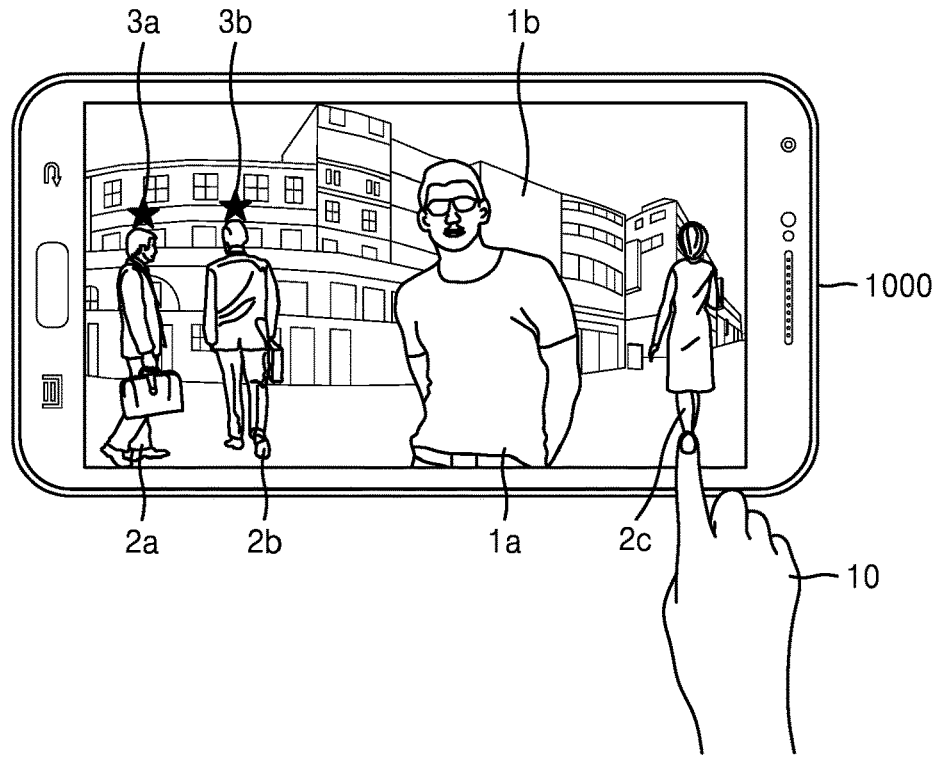
FIGS. 13 and 14 illustrate examples of detecting a sub-object in response to a user input, according to some embodiments.
Figure 14:
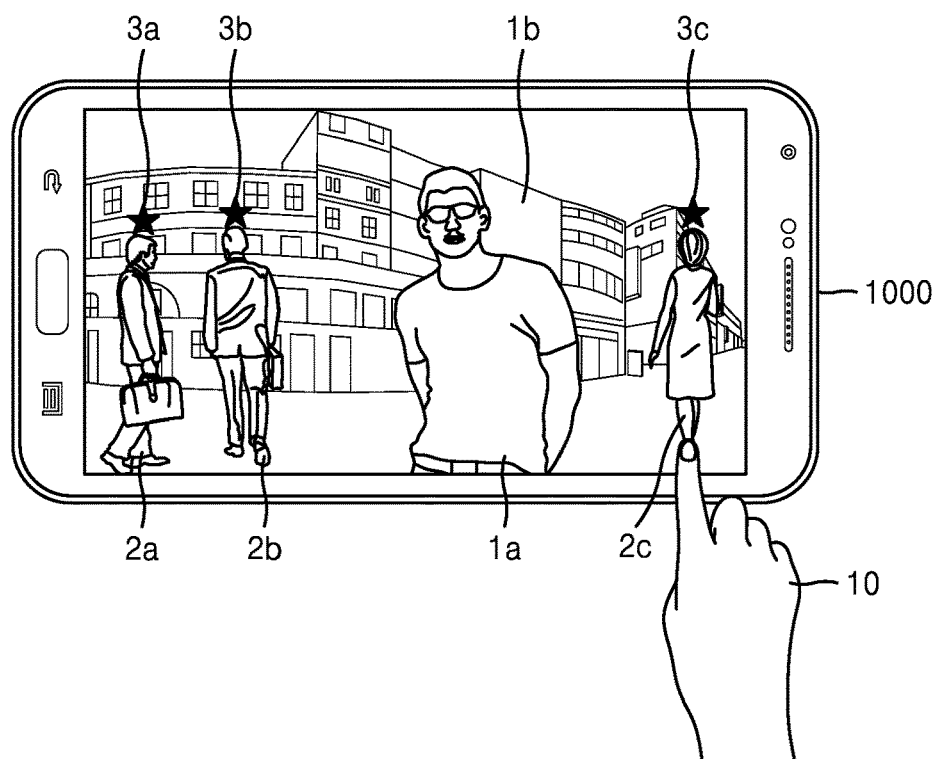

Although it has been described above that the hidden areas of the main object 1b are restored clearly and then image processing for lowering the sharpness of the clearly restored areas of the main object 1b is additionally performed, embodiments are not limited thereto. Without performing the image processing for lowering the sharpness of the clearly restored areas of the main object 1b, the hidden areas of the main object 1b may be restored such that sharpness of the main object 1b included in restored areas corresponds to sharpness of the vicinity of the restored areas FIG. 12 is a flowchart of a method of detecting a sub-object in correspondence with a user input, according to some embodiments. FIGS. 13 and 14 illustrate examples of detecting a sub-object in correspondence with a user input, according to some embodiments.

Referring to FIG. 12, the image acquisition device 1000 may receive an input of selecting an object included in a first image, in operation S1210, detect the selected object as a sub-object, in operation S1230, and display an indicator indicating that the detected object is a sub-object, in operation S1250.

In operation S1210, the image acquisition device 1000 may receive an input of selecting an object included in the first image from the user via a user input interface.

Referring to FIG. 13, a user 10 may select an object 2c included in the first image displayed on a touch screen of the image acquisition device 1000. For example, the user 10 may select an area where the object 2c is located, by using the touch screen.

In operation S1230, the image acquisition device 1000 may detect the selected object 2c as a sub-object.

According to an embodiment, the image acquisition device 1000 may detect the selected object 2c as a sub-object by using the AI neural network. The AI neural network may detect the appearances of objects (e.g., a tree, a trash can, a streetlamp, traffic lights, a stall, a human, and an animal) included in an image by learning images of the appearances of objects as the learning data. The image acquisition device 1000 may detect an object that includes an area that has received a user input or is located in the vicinity of the area, by using an AI neural network.

Referring to FIG. 13, the image acquisition device 1000 may detect the object 2c located in the vicinity of an area that has received an input of the user 10. The image acquisition device 1000 may detect the appearance of the object 2c, which is also referred to as a human 2c, located in the vicinity of the area that has received an input of the user 10, by using the AI neural network. The image acquisition device 1000 may detect the human 2c as a sub-object, based on the appearance of the detected human 2c.

In operation S1250, the image acquisition device 1000 may display an indicator indicating that the selected object 2c is a sub-object.

Referring to FIG. 14, the image acquisition device 1000 may display an indicator in a star shape indicating that the selected object 2c is a sub-object, near the object 2c. However, embodiments are not limited thereto. As shown in FIG. 4, the object 2c may be marked by a dashed line to indicate that the object 2c is a sub-object. As shown in FIG. 5, at least a portion of the object 2c may be overlaid with at least one of a preset color and a preset pattern and then displayed. The image acquisition device 1000 may display an indicator indicating that the selected object 2c is a sub-object, based on the appearance of the object 2c detected using the AI neural network.

Figure 15:
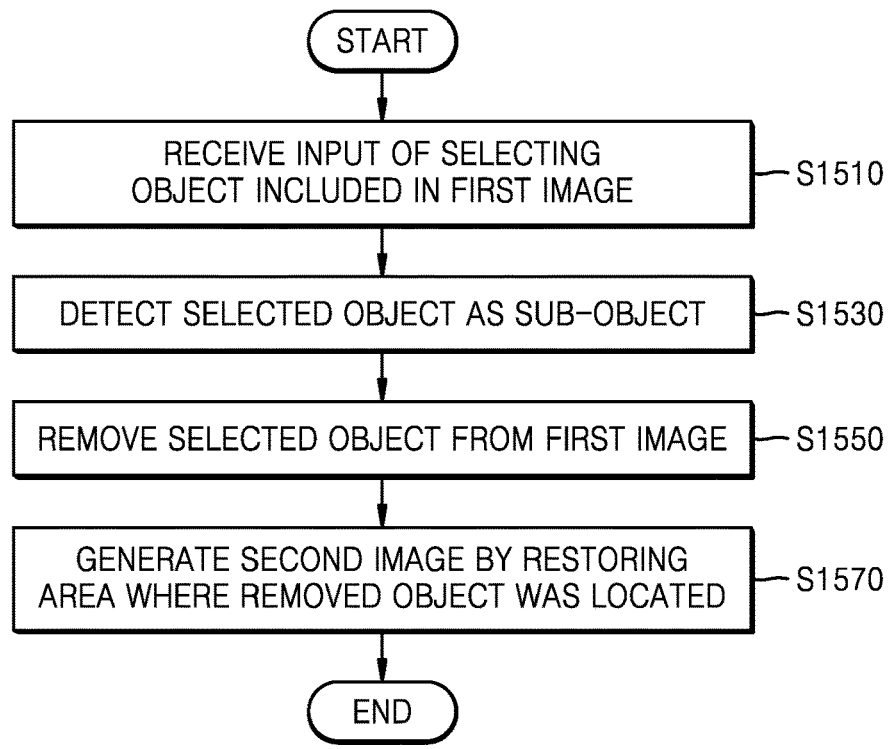
FIG. 15 is a flowchart of a method of restoring at least a portion of a main object hidden by a sub-object in response to a user input, according to some embodiments.
Figure 16:
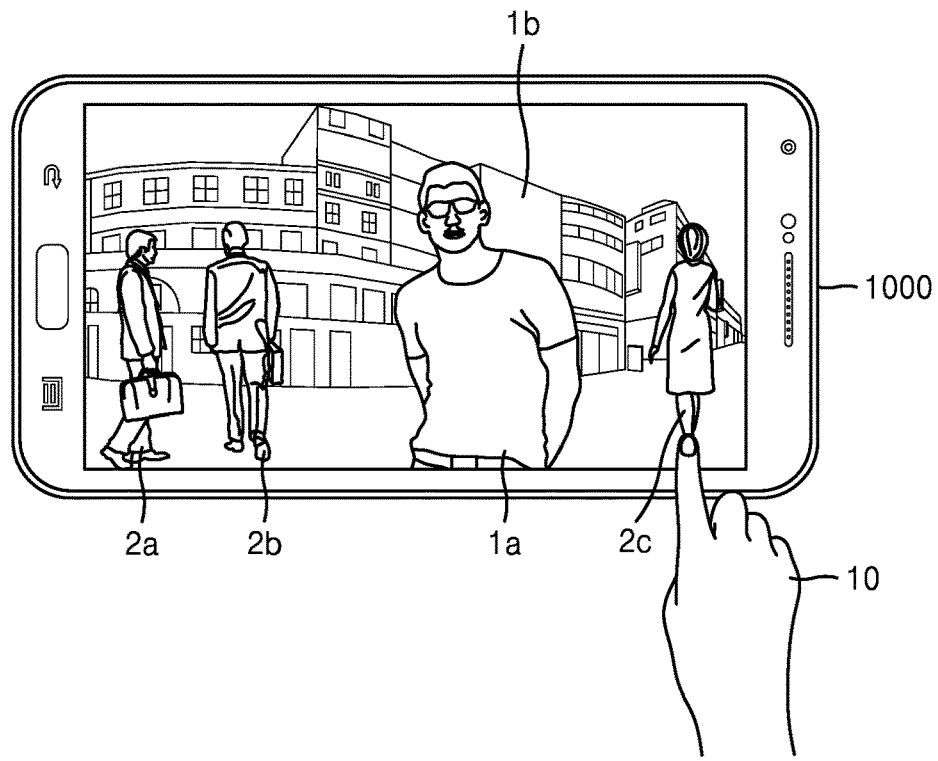
FIGS. 16, 17 and 18 illustrate examples of restoring at least a portion of a main object hidden by a sub-object, in response to a user input, according to some embodiments.
Figure 17:
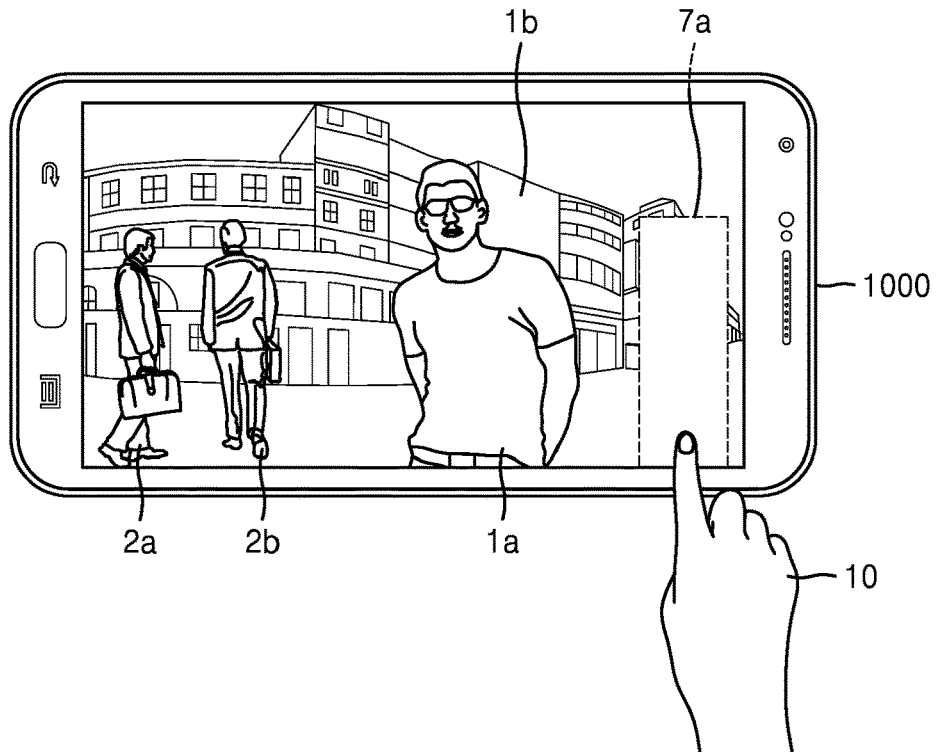
Figure 18:
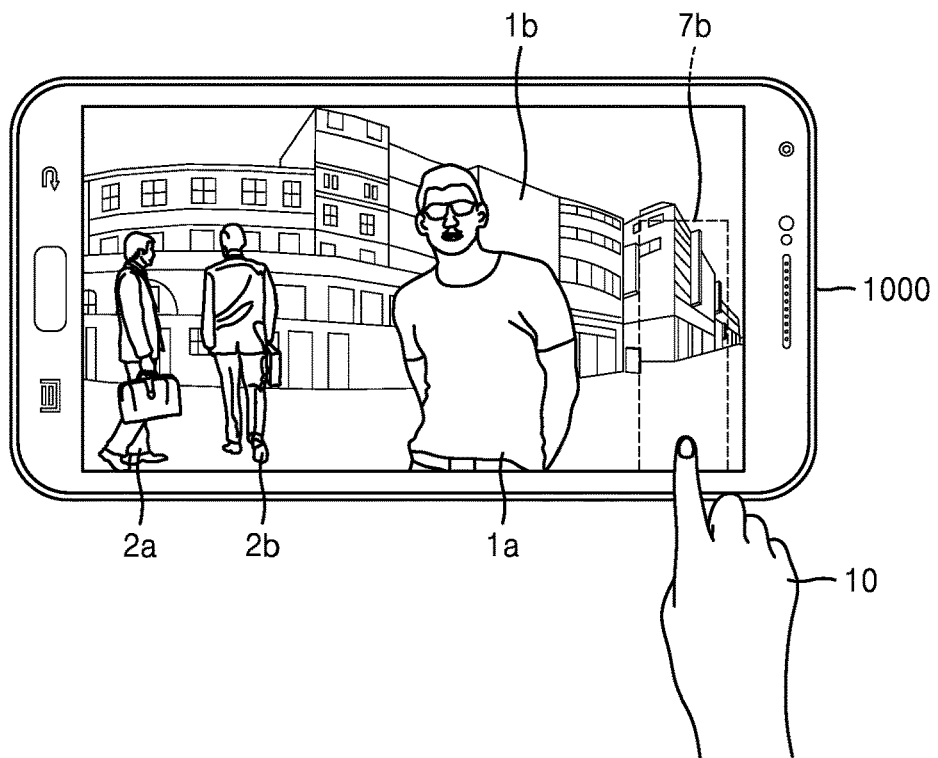

FIG. 15 is a flowchart of a method of restoring at least a portion of a main object hidden by a sub-object in correspondence with a user input, according to some embodiments. FIGS. 16 through 18 illustrate examples of restoring at least a portion of a main object hidden by a sub-object, in correspondence with a user input, according to some embodiments.

Referring to FIG. 15, the image acquisition device 1000 may receive an input of selecting an object included in a first image (a "selection" of the representation, data, or appearance of the object in the first image), in operation S1510, detect the selected object as a sub-object, in operation S1530, remove the selected object from the first image, in operation S1550, and generate a second image by restoring an area where the removed object was located, in operation S1570.

In operation S1510, the image acquisition device 1000 may receive an input of selecting an object included in the first image, from the user via the user input interface.

Referring to FIG. 16, the user 10 may select the object 2c included in the first image displayed on the touch screen of the image acquisition device 1000. For example, the user 10 may select an area where the object 2c is located, by using the touch screen.

In operation S1530, the image acquisition device 1000 may detect the selected object 2c as a sub-object. Operation S1530 is similar to operation S1230, and thus a redundant description thereof will be omitted.

In operation S1550, the image acquisition device 1000 may remove the selected object 2c from the first image.

According to an embodiment, the image acquisition device 1000 may remove, from the first image, data associated with at least some area of the first image where the object 2c is located. For example, the image acquisition device 1000 may remove only data associated with the sub-object 2c from the first image. Alternatively, as shown in an area 7a of FIG. 17, the image acquisition device 1000 may remove, from the first image, data associated with the area 7a including the sub-object 2c. Operation S1550 is similar to operation S650, and thus a redundant description thereof will be omitted.

In operation S1570, the image acquisition device 1000 may restore at least a portion of the first image from which data has been removed.

According to an embodiment, the image acquisition device 1000 may restore the data-removed area 7a such that at least a portion of the main object 1b hidden by the sub-object 2c is included. Referring to FIG. 18, the image acquisition device 1000 may restore the data-removed area 7a such that at least a portion of the main object 1b is included, thereby generating a restored area 7b. Operation S1570 is similar to operation S670, and thus a redundant description thereof will be omitted.

FIG. 19 is a flowchart of a method of tracking a motion of a sub-object within an image, according to some embodiments. FIGS. 20 through 23 are views illustrating examples of tracking a motion of a sub-object within an image, according to some embodiments.

Referring to FIG. 19, the image acquisition device 1000 may acquire a first image by using the camera, in operation S1910, detect at least one of a main object and a sub-object from the first image, in operation S1930, track a motion of the detected sub-object, in operation S1950, and display an indicator indicating the detected sub-object, based on the motion of the sub-object, in operation S1970.

Operation S1910 is similar to operation S210, and thus a redundant description thereof will be omitted.

Operation S1930 is similar to operation S230, and thus a redundant description thereof will be omitted.

In operation S1950, the image acquisition device 1000 may track the motion of the detected sub-object.

According to an embodiment, the image acquisition device 1000 may track motions of the sub-objects 2a and 2b by inputting the first image to the AI neural network. Referring to FIG. 20, the AI neural network may detect the appearances of the sub-objects 2a and 2b from the first image and may track the motions of the sub-objects 2a and 2b, based on the detected appearances of the sub-objects 2a and 2b. For example, the AI neural network may track the motion of the sub-object 2a from the left to the right by recognizing the appearance of the sub-object 2a as the shape of a human who walks from the left to the right. As another example, the AI neural network may track the motion of the sub-object 2b from a left lower end to a right upper end by recognizing the appearance of the sub-object 2b as the shape of a human who walks from the left lower end to the right upper end.

According to an embodiment, the image acquisition device 1000 may track the motions of the sub-objects 2a and 2b by using a sensor included in the camera. The sensor included in the camera may include a sensor capable of detecting a phase difference of an object. The phase difference detection sensor may detect a phase change caused according to the motions of the sub-objects 2a and 2b. The image acquisition device 1000 may track the motions of the sub-objects 2a and 2b, based on changes in the phases of the detected sub-objects 2a and 2b.

According to an embodiment, the image acquisition device 1000 may acquire a plurality of images by using the camera and track the motion of the detected sub-object, based on the acquired plurality of images. The image acquisition device 1000 may track the motions of the sub-objects 2a and 2b by inputting the acquired plurality of images to the AI neural network. For example, the image acquisition device 1000 may track the motions of the sub-objects 2a and 2b by detecting motion vectors of the sub-objects 2a and 2b from the first image. The image acquisition device 1000 may detect the motion vectors of the sub-objects 2a and 2b by acquiring a plurality of images before and after the first image by using the camera and inputting the plurality of images acquired before and after the first image to the AI neural network. For example, the AI neural network may detect the motion vectors of the sub-objects 2a and 2b by comparing the sub-objects 2a and 2b included in the first image with sub-objects 2a and 2b included in the plurality of images acquired before and after the first image. As another example, the AI neural network may detect the motion vectors of the sub-objects 2a and 2b by splitting the first image into a plurality of blocks and each of the plurality of images acquired before and after the first image into a plurality of blocks and comparing the plurality of blocks of the first image with the plurality of blocks of each of the plurality of images acquired before and after the first image.

In operation S1970, the image acquisition device 1000 may display an indicator indicating the detected sub-object, based on the motion of the detected sub-object.

Figure 21:
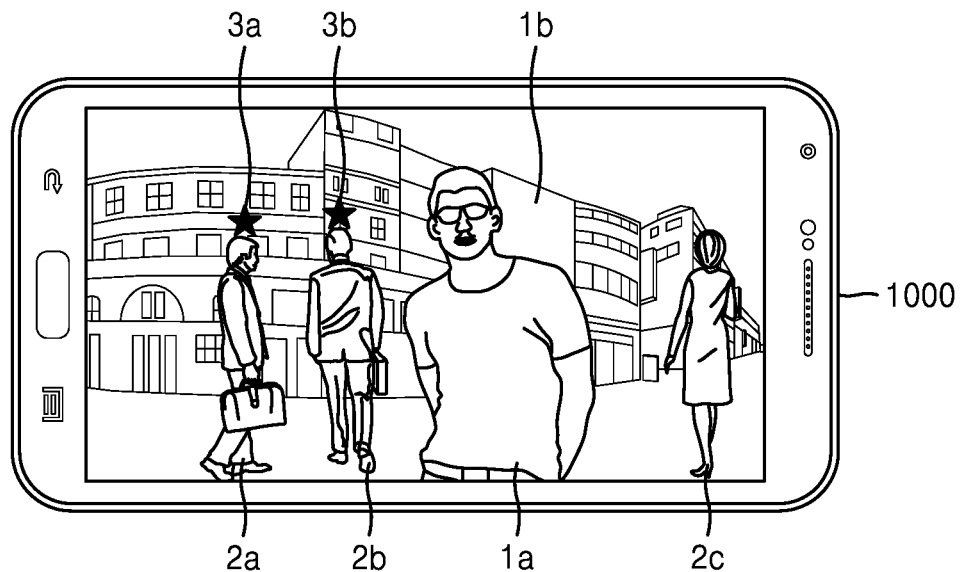

Referring to FIGS. 20 and 21, the image acquisition device 1000 may display the indicators 3a and 3b indicating the sub-objects 2a and 2b to correspond to the motions of the sub-objects 2a and 2b. As the sub-object 2a moves to the right, the image acquisition device 1000 may display the indicator 3a such that the indicator 3a located near the sub-object 2a is located near the sub-object 2a moved to the right. As the sub-object 2b moves to the right upper end, the image acquisition device 1000 may display the indicator 3b such that the indicator 3b located near the sub-object 2b is located near the sub-object 2b moved to the right upper end.

Figure 22:
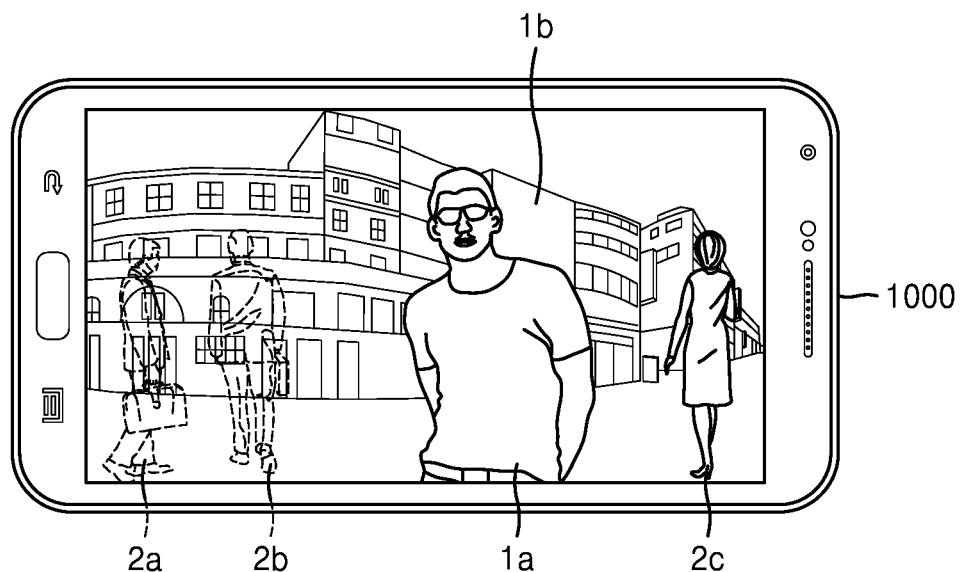
Figure 23:
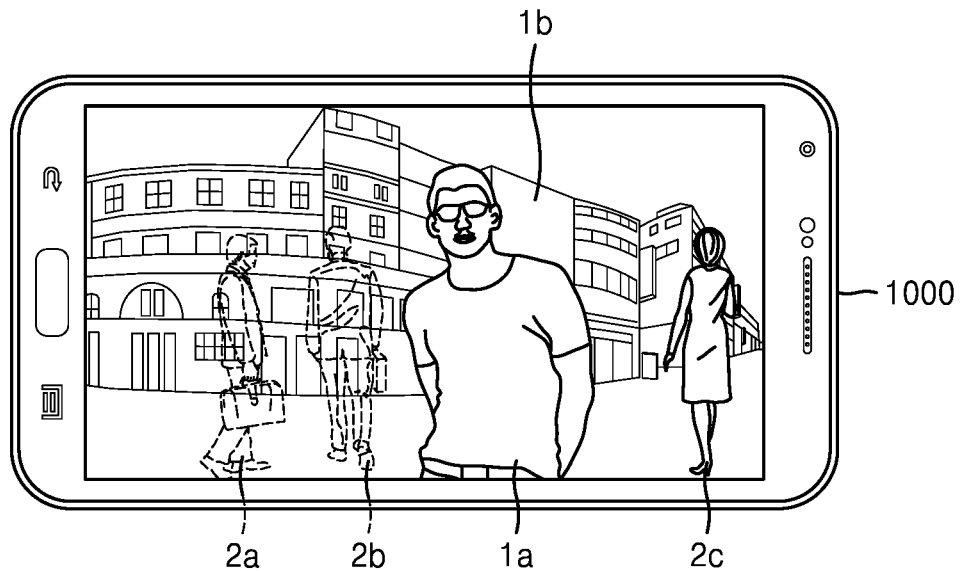

Referring to FIGS. 22 and 23, the image acquisition device 1000 may display the appearances of the sub-objects 2a and 2b in dashed lines. The image acquisition device 1000 may display the appearances of the sub-objects 2a and 2b in dashed lines, to correspond to the motions of the sub-objects 2a and 2b.

When the image acquisition device 1000 overlays at least respective portions of the sub-objects 2a and 2b with at least one of a preset color and a preset pattern and displays a result of the overlaying, the image acquisition device 1000 may overlay at least respective portions of the moving sub-objects 2a and 2b with at least one of a preset color and a preset pattern to correspond to the motions of the sub-objects 2a and 2b, and may display a result of the overlaying.

Figure 24:
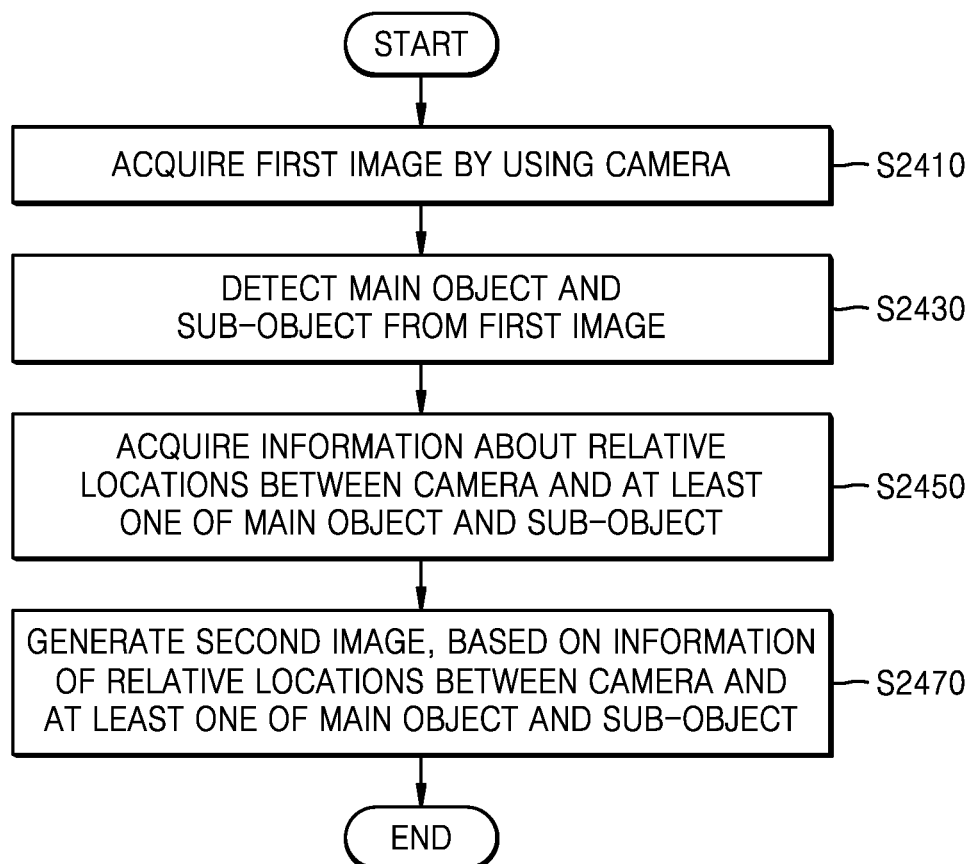
FIG. 24 is a flowchart of a method of restoring at least a portion of a main object hidden by a sub-object, based on relative locations between a camera and at least one of the main object and the sub-object, according to some embodiments.
Figure 25:
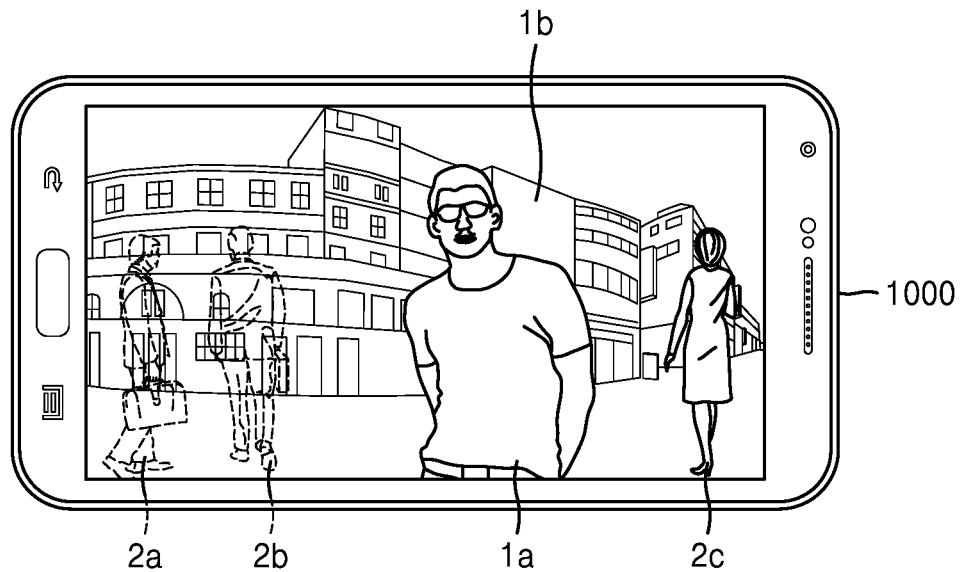
FIGS. 25 and 26 illustrate examples of detecting a main object and a sub-object when the camera moves, according to some embodiments.
Figure 26:
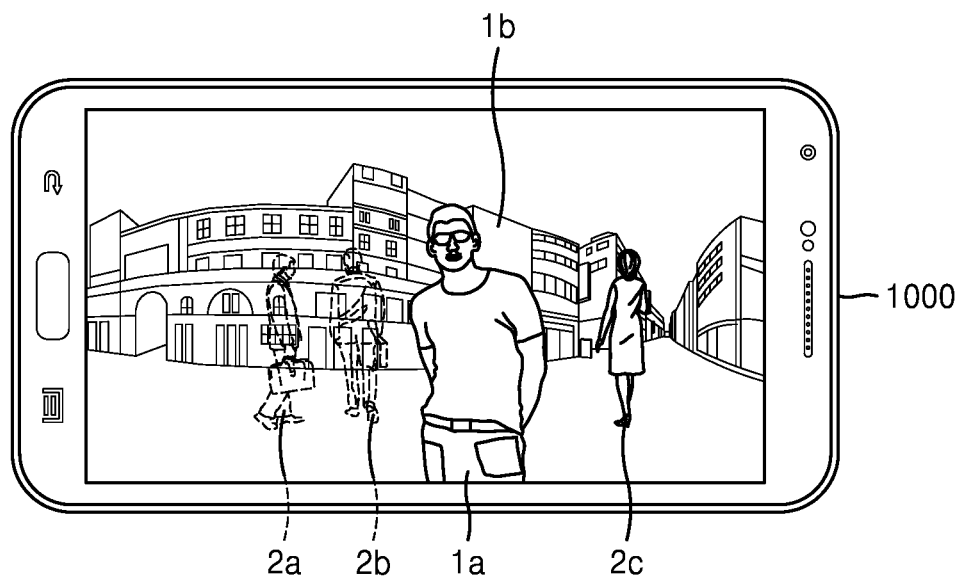

FIG. 24 is a flowchart of a method of restoring at least a portion of a main object hidden by a sub-object, based on relative locations between a camera and at least one of the main object and the sub-object, according to some embodiments. FIGS. 25 and 26 illustrate examples of detecting a main object and a sub-object when the camera moves, according to some embodiments.

Referring to FIG. 24, the image acquisition device 1000 may acquire a first image by using the camera, in operation S2410, detect the main object and the sub-object from the first image, in operation S2430, acquire information about the relative locations between the camera and at least one of the main object and the sub-object, in operation S2450, and display a second image, based on the acquired information about the relative locations, in operation S2470.

Operation S2410 is similar to operation S210, and thus a redundant description thereof will be omitted.

Operation S2430 is similar to operation S230, and thus a redundant description thereof will be omitted.

In operation S2450, the image acquisition device 1000 may acquire the information about the relative locations between the camera and at least one of the main object and the sub-object.

According to an embodiment, the image acquisition device 1000 may acquire location information of the camera. For example, the image acquisition device 1000 may acquire the location information of the camera by using a position sensor, such as a global positioning system (GPS) module. As another example, the image acquisition device 1000 may acquire the location information of the camera by using a short-range communication technique, such as Wifi, Bluetooth, Zigbee, and beacon.

According to an embodiment, the image acquisition device 1000 may acquire the location information of the camera from the first image by using the AI neural network. For example, the AI neural network may recognize the main object 1b included in the first image and acquire location information of a region where the recognized object 1b is located. In detail, when the main object 1b is a major building in a certain region, the AI neural network may acquire location information of the region where the main object 1b is located. Because the camera that captures the first image including the main object 1b will be located in a region similar to the region where the main object 1*b* is located, the AI neural network may acquire the location information of the camera.

As another example, the AI neural network may acquire the location information of the main object 1*b* by using the location information of the region where the main object 1*b* included in the first image is located, photographing information (e.g., a focal length) of the first image, and a size of the main object 1*b* within the first image.

According to an embodiment, the image acquisition device 1000 may acquire location information of a main object. For example, the image acquisition device 1000 may acquire the location information of the camera by using the position sensor, such as a GPS module, and may acquire location information of the main object by using the photographing information (e.g., a focal length) of the first image, and a size of the main object within the first image.

According to an embodiment, the image acquisition device 1000 may acquire the location information of the main object from the first image by using the AI neural network. For example, the AI neural network may recognize the main object 1*b* included in the first image and acquire location information of a region where the recognized main object 1*b* is located. In detail, when the main object 1*b* is a major building in a certain region, the AI neural network may acquire location information of the region where the main object 1*b* is located.

According to an embodiment, the image acquisition device 1000 may acquire pieces of location information of the sub-objects 2*a*, 2*b*, and 2*c*. For example, the image acquisition device 1000 may acquire the location information of the camera by using the position sensor, such as a GPS module, and may acquire the location information of the main object by using the photographing information (e.g., a focal length) of the first image and respective sizes of the sub-objects 2*a*, 2*b*, and 2*c* within the first image.

According to an embodiment, the image acquisition device 1000 may acquire information of relative locations between the camera and the main object. For example, the image acquisition device 1000 may acquire the information of the relative locations between the camera and the main object, based on the acquired location information of the camera and the acquired location information of the main object. The information of relative locations depends, for example, on depth or distance from the camera to an object in the field of view of the camera. As another example, the image acquisition device 1000 may acquire the information of the relative locations between the camera and the main object by using the photographing information (e.g., a focal length) of the first image and the size of the main object within the first image, by using the AI neural network.

According to an embodiment, the image acquisition device 1000 may acquire information of relative locations between the camera and the sub-object. For example, the image acquisition device 1000 may acquire the information of the relative locations between the camera and the sub-object, based on the acquired location information of the camera and location information of the sub-object. As another example, the image acquisition device 1000 may acquire the information of the relative locations between the camera and the sub-object by using the photographing information (e.g., a focal length) of the first image and the size of the sub-object within the first image, by using the AI neural network.

In operation S2470, the image acquisition device 1000 may generate a second image, based on the information of the relative locations between the camera and at least one of the main object and the sub-object.

According to an embodiment, the image acquisition device 1000 may remove, from the first image, data associated with at least some areas of the first image where the sub-objects 2*a*, 2*b*, and 2*c* are respectively located, by using the AI neural network.

For example, the AI neural network may track the motions of the sub-objects 2*a*, 2*b*, and 2*c*, based on information of relative locations between the camera and the sub-objects 2*a*, 2*b*, and 2*c*. For example, the AI neural network may detect a change in the information of the relative locations between the camera and the sub-objects 2*a*, 2*b*, and 2*c*, by using the phase difference detection sensor included in the camera. For example, relative locations may be determined both at a first time and at a second time. The change in information is the change in the relative location information from the first time to the second time. As another example, the AI neural network may detect the change in the information of the relative locations between the camera and the sub-objects 2*a*, 2*b*, and 2*c*, by comparing a plurality of images with each other. As another example, the AI neural network may detect the change in the information of the relative locations between the camera and the sub-objects 2*a*, 2*b*, and 2*c*, by detecting motion vectors from a plurality of images acquired using the camera. The AI neural network may predict directions and speeds of the motions of the sub-objects 2*a*, 2*b*, and 2*c*, based on the change in the information of the relative locations between the camera and the sub-objects 2*a*, 2*b*, and 2*c*. The AI neural network may track the motions of the sub-objects 2*a*, 2*b*, and 2*c*, based on the predicted directions and speeds of the motions of the sub-objects 2*a*, 2*b*, and 2*c*. Tracking a motion of a sub-object by using the AI neural network is similar to operation S1950, and thus a redundant description thereof will be omitted.

Referring to FIGS. 25 and 26, as the camera becomes farther from the main objects 1*a* and 1*b* and the sub-objects 2*a*, 2*b*, and 2*c*, information of relative locations between the camera and the main objects 1*a* and 1*b* and the sub-objects 2*a*, 2*b*, and 2*c* may change. When the user takes a picture, the user may change a location of the camera to change the composition of the picture. For example, the user may take a picture by moving one step backwards from the main object 1*b*, which is also referred to as a building 1*b*, of a certain region, in order to capture in a photograph a wider view of the building 1*b*. Accordingly, information of relative locations between the camera and each of the main objects 1*a* and 1*b* and the sub-objects 2*a*, 2*b*, and 2*c* may be change because the user with the camera moved a further distance away from the building 1*b*.

The image acquisition device 1000 may track the motions of the sub-objects 2*a*, 2*b*, and 2*c*, based on the changed location information. The image acquisition device 1000 may display an indicator indicating the sub-objects 2*a* and 2*b* in correspondence with the motions of the sub-objects 2*a* and 2*b*. Referring to FIGS. 25 and 26, the image acquisition device 1000 may track motions of the sub-objects 2*a* and 2*b* in a direction toward a right upper end. The image acquisition device 1000 may display the indicator indicating the sub-objects 2*a* and 2*b* by marking or rendering the appearances of the sub-objects 2*a* and 2*b* in dashed lines in correspondence with the motions of the sub-objects 2*a* and 2*b*. In some embodiments, data in the image corresponding to an object in the field of view of the camera may be referred to as an appearance corresponding to the object, or simply as an appearance.

The AI neural network may efficiently remove, from the first image, data associated with at least some areas of the first image where the sub-objects 2a, 2b, and 2c are respectively located, based on the motions of the sub-objects 2a, 2b, and 2c. The removing, by the image acquisition device 1000, from the first image, the data associated with at least some areas of the first image where the sub-objects 2a, 2b, and 2c are respectively located is similar to operation S650, and thus a redundant description thereof will be omitted.

According to an embodiment, the image acquisition device 1000 may track the motions of the sub-objects 2a, 2b, and 2 and may remove, from the first image, data associated with at least some areas of the first image where the sub-objects 2a, 2b, and 2c are respectively located. The tracking, by the image acquisition device 1000, of the motions of the sub-objects 2a, 2b, and 2c is similar to operation S1950 and the image acquisition device 1000 removing, from the first image, the data associated with at least some areas of the first image where the sub-objects 2a, 2b, and 2c are respectively located are similar to operation S650, and thus redundant descriptions thereof will be omitted.

According to an embodiment, the image acquisition device 1000 may restore a data-removed area such that at least a portion of the main object 1b hidden by the sub-objects 2a, 2b, and 2c is included, based on the information of the relative locations between the camera and the main object 1b, by using the AI neural network. For example, the AI neural network may acquire location information of the main object 1b, which is a building located in a certain region. As in operation S2450, the AI neural network may acquire information of relative locations between the camera and the main object 1b. The AI neural network may search for an image of the main object 1b, similar to the first image, based on the location information of the main object 1b and the information of the relative locations between the camera and the main object 1b. The AI neural network may restore the data-removed area of the first image by learning at least one found image as the learning data. The AI neural network may generate the second image by restoring the data-removed area within the first image.

According to an embodiment, the image acquisition device 1000 may display the second image on the display by restoring the data-removed area within the first image. The image acquisition device 1000 may store the second image in a memory. In this case, the image acquisition device 1000 may store the second image in the memory when the second image is generated by restoring the data-removed area within the first image, or may store the second image in the memory in response to a user input.

Figure 27:
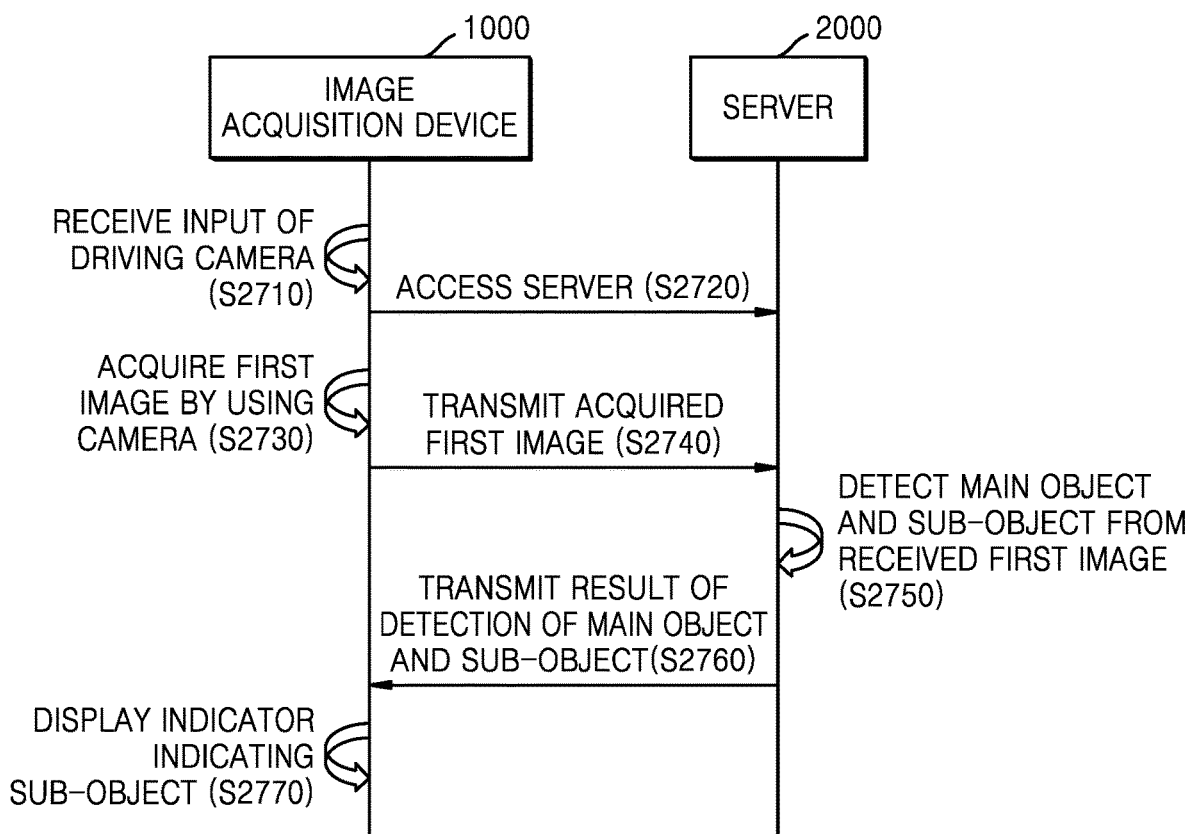
FIG. 27 is a view illustrating a method of displaying an indicator indicating a sub-object by using a server, according to some embodiments.
Figure 28:
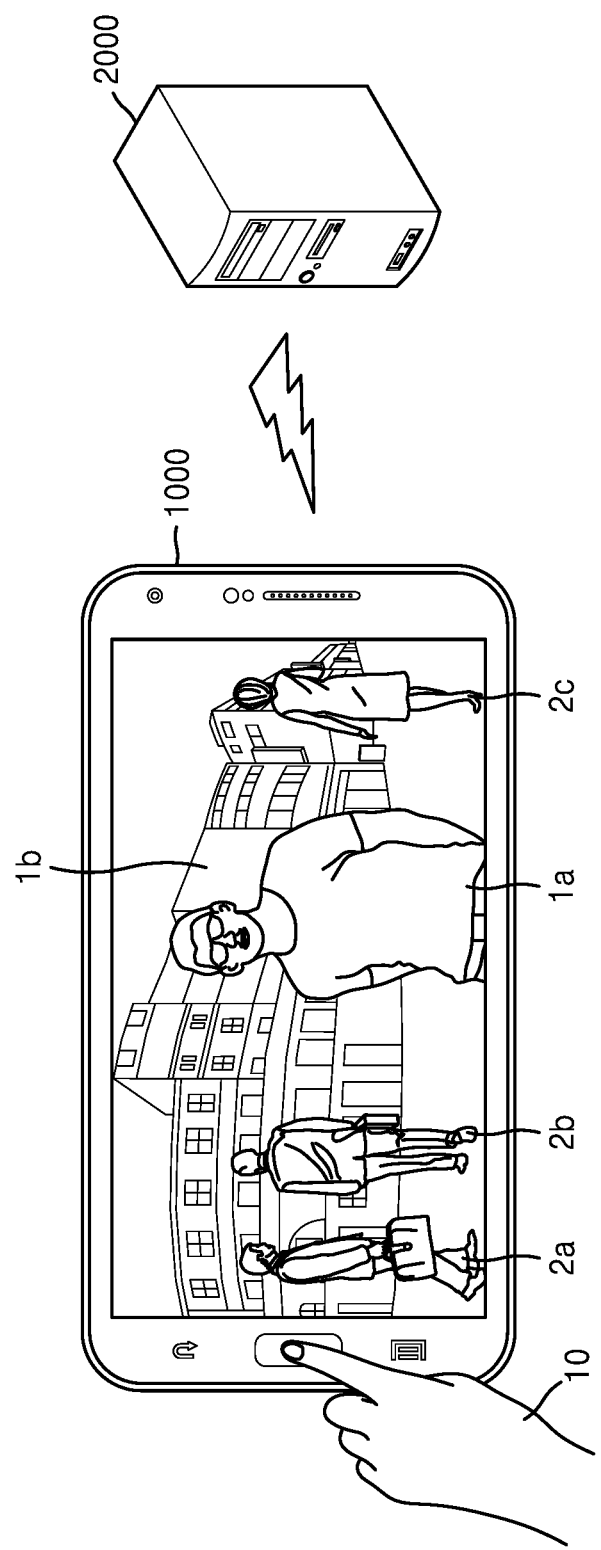
FIGS. 28 and 29 are views illustrating examples of displaying an indicator indicating a sub-object by using the server, according to some embodiments.
Figure 29:
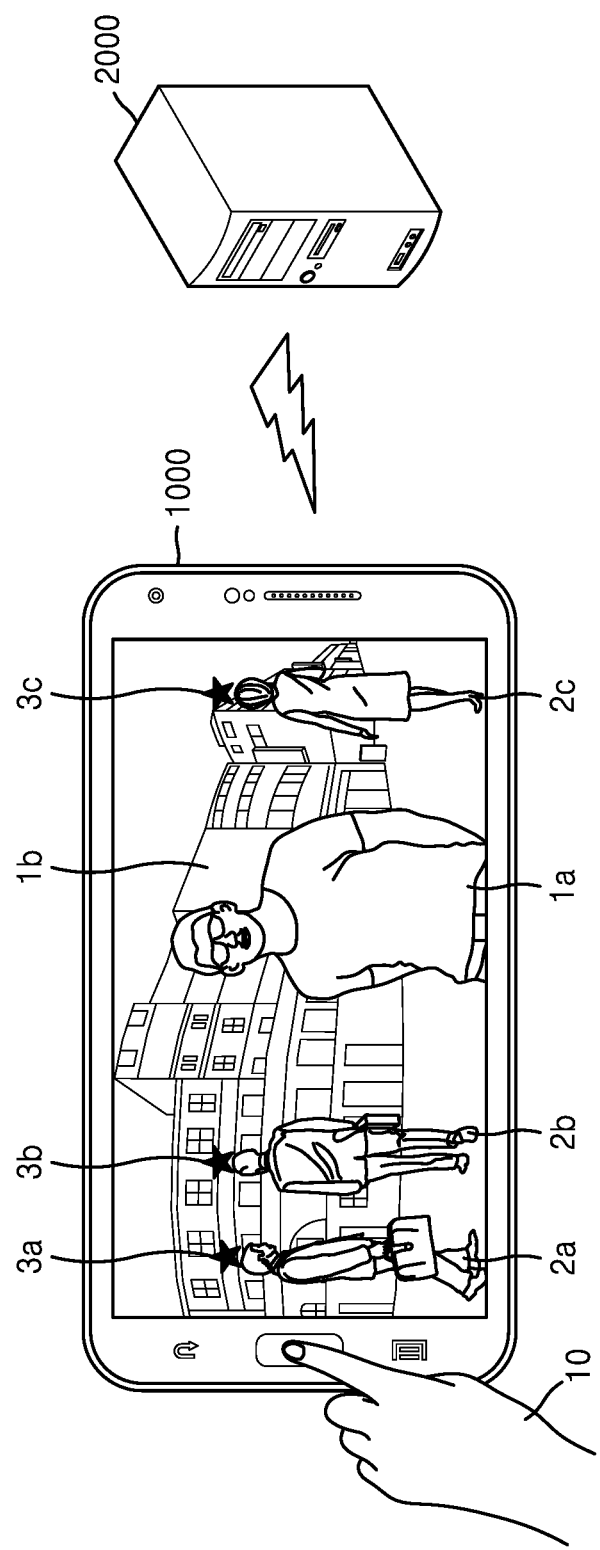

FIG. 27 is a view illustrating a method of displaying an indicator indicating a sub-object by using a server 2000, according to some embodiments. FIGS. 28 and 29 are views illustrating examples of displaying an indicator indicating a sub-object by using the server 2000, according to some embodiments.

Referring to FIG. 27, the image acquisition device 1000 may receive an input of driving the camera from the user, in operation S2710, access the server 2000, in operation S2720, acquire the first image by using the camera, in operation S2730, and transmit the first image to the server 2000, in operation S2740. The server 2000 may detect a main object and a sub-object from the received first image, in operation S2750, and transmit information about a result of the detection of the main object and the sub-object to the image registration device 1000, in operation S2760. In operation S2770, the image acquisition device 1000 may display the indicator indicating the sub-object, based on the information received from the server 2000.

In operation S2710, the image acquisition device 1000 may receive an input of driving the camera, from the user. Referring to FIG. 28, the image acquisition device 1000 may receive, from the user 10, an input with respect to a button for driving the camera. Alternatively, the image acquisition device 1000 may receive, from the user 10, an input for driving an application regarding the camera.

In operation S2720, the image acquisition device 1000 may access the server 2000.

According to an embodiment, when the image acquisition device 1000 receives, from the user, an input of driving the camera, the image acquisition device 1000 may automatically access the server 2000 by forming a communication link with the server. The communication link may be, for example, an Internet-based session. The server 2000 may include an AI neural network that detects at least one of the main objects 1a and 1b and the sub-objects 2a, 2b, and 2c from the first image. The server 2000 may include an AI neural network that removes, from the first image, data associated with at least some areas of the first image where the sub-objects 2a, 2b, and 2c are respectively located, and restores a data-removed area such that at least a portion of the main object 1b hidden by the sub-objects 2a, 2b, and 2c is included.

In operation S2730, the image acquisition device 1000 may acquire the first image by using the camera. Operation S2730 is similar to operation S210, and thus a redundant description thereof will be omitted.

In operation S2740, the image acquisition device 1000 may transmit, over the communication link, the acquired first image to the server 2000.

In operation S2750, the server 2000 may detect the main object and the sub-object from the received first image by using the AI neural network. Referring to FIGS. 28 and 29, the server 2000 may detect the main objects 1a and 1b and the sub-objects 2a, 2b, and 2c from the first image. The AI neural network may be specialized for the user of the image acquisition device 1000. For example, the AI neural network may have learned data associated with the user (e.g., at least one image stored in the image acquisition device 1000 of the user) as the learning data. The AI neural network detecting the main object and the sub-object from the first image is similar to operation S230, and thus a redundant description thereof will be omitted.

In operation S2760, the server 2000 may transmit to the image acquisition device 1000 over the communication link a result of the detection of the main object and the sub-object from the first image by using the AI neural network. For example, the server 2000 may transmit to the image acquisition device 1000 a first image including indicators indicating the main object and the sub-object. Alternatively, the server 2000 may transmit, to the image acquisition device 1000, information indicating objects included in the first image and information indicating whether each of the objects is a main object or a sub-object.

In operation S2770, the image acquisition device 1000 may display indicators 3a, 3b, and 3c respectively indicating the sub-objects 2a, 2b, and 2c. Operation S2770 is similar to operation S250, and thus a redundant description thereof will be omitted.

When the image acquisition device 1000 accesses the server 2000 in response to reception of the input for driving the camera from the user, the image acquisition device 1000 may receive data about the AI neural network from the server 2000. For example, the image acquisition device 1000 may receive, from the server 2000, a software module that implements the AI neural network. As another example, the image acquisition device 1000 may receive, from the server 2000, data used to update the AI neural network. The image acquisition device 1000 may detect the main object and the sub-object from the first image, based on the received data about the AI neural network.

Figure 30:
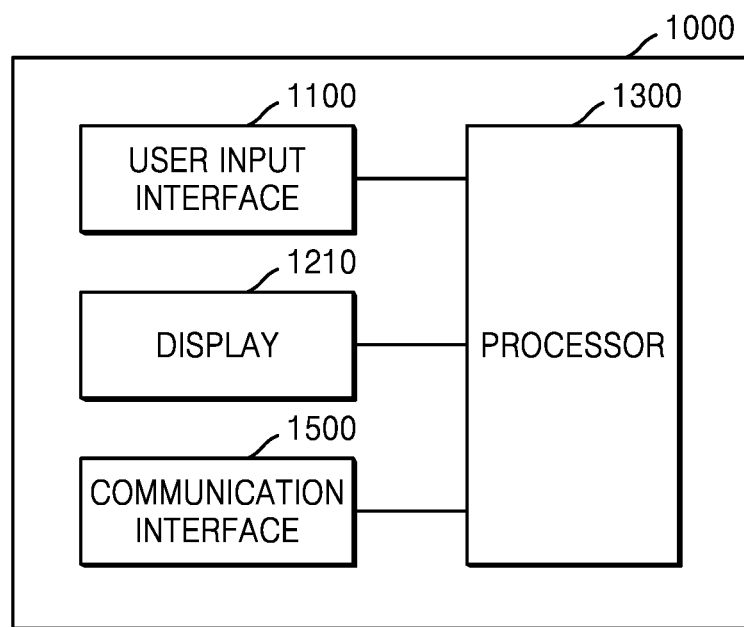
FIGS. 30 and 31 are block diagrams of the image acquisition device according to some embodiments.
Figure 31:
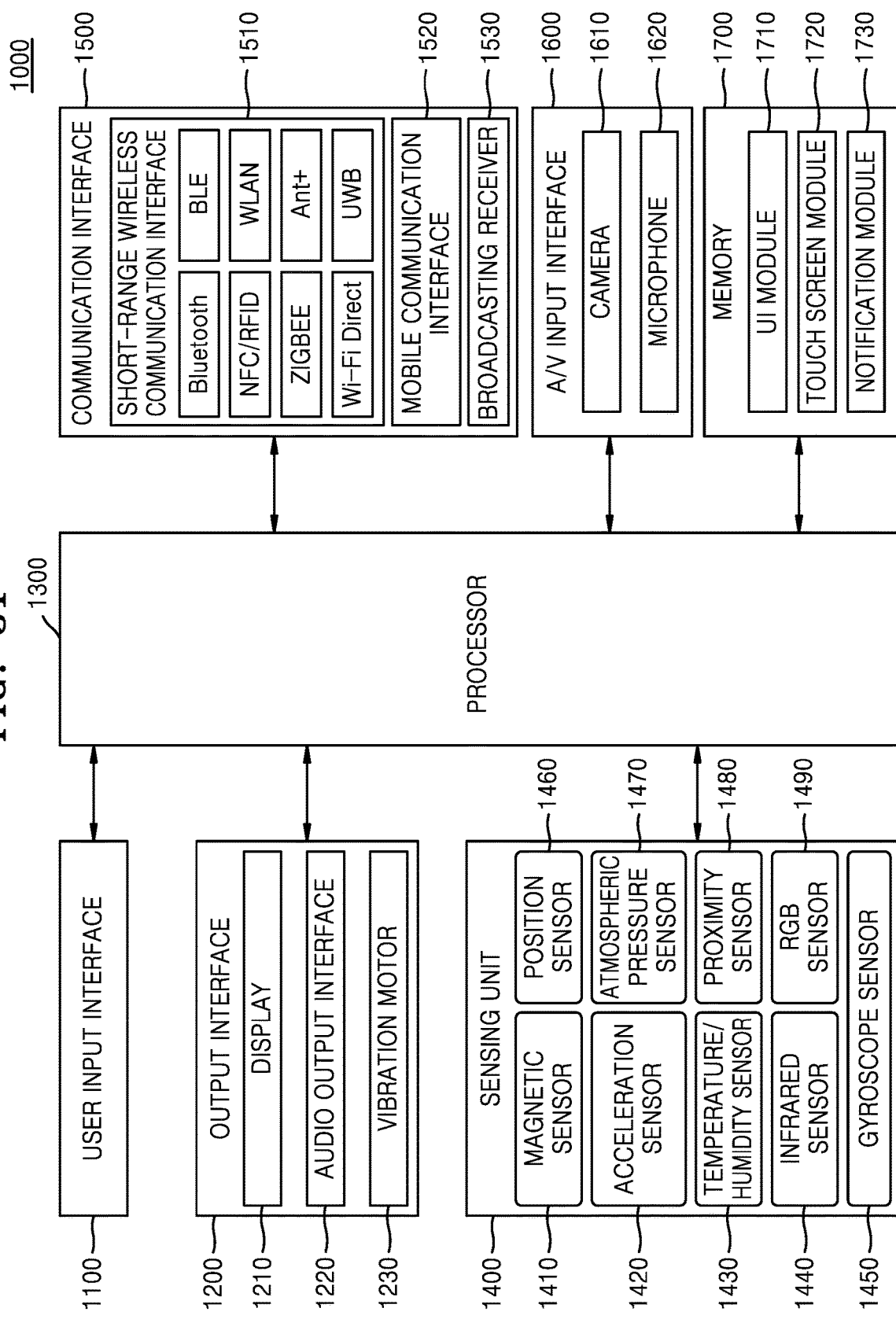

FIGS. 30 and 31 are block diagrams of the image acquisition device 1000 according to some embodiments.

Referring to FIG. 30, the image acquisition device 1000 may include a user input interface 1100, a display 1210, a processor 1300, and a communication interface 1500. All of the components illustrated in FIG. 30 are not essential components of the image acquisition device 1000. More or less components than those illustrated in FIG. 30 may constitute the image acquisition device 1000.

For example, referring to FIG. 31, the image acquisition device 1000 may further include a sensing unit 1400, an audio/video (A/V) input interface 1600, an output interface 1200 and a memory 1700, in addition to the user input interface 1100, the processor 1300, and the communication interface 1500.

The user input interface 1100 denotes a unit via which a user inputs data for controlling the image acquisition device 1000. For example, the user input interface 1100 may be, but is not limited to, a key pad, a dome switch, a touch pad (e.g., a capacitive overlay type, a resistive overlay type, an infrared beam type, an integral strain gauge type, a surface acoustic wave type, a piezo electric type, or the like), a jog wheel, or a jog switch. The user input interface 1100 may include a touch screen that receives a touch input of the user, by combining a touch layer with the display 1210.

The user input interface 1100 may receive a user input of selecting at least one object (a "selection") displayed on the display 1210.

The output interface 1200 may output an audio signal, a video signal, or a vibration signal, and may include the display 1210, an audio output interface 1220, and a vibration motor 1230.

The display 1210 may display information that is processed by the image acquisition device 1000. For example, the display 1210 may display a first image and an indicator indicating a sub-object. The display 1210 may display a second image obtained by restoring a data-removed area such that at least a portion of a main object is included.

The audio output interface 1220 outputs audio data that is received from the communication interface 1500 or stored in the memory 1700. The audio output interface 1220 also outputs an audio signal (for example, a call signal receiving sound, a message receiving sound, or a notification sound) related with a function of the image acquisition device 1000.

The processor 1300 typically controls an overall operation of the image acquisition device 1000. For example, the processor 1300 may control the user input interface 1100, the output interface 1200, the sensing unit 1400, the communication interface 1500, the A/V input interface 1600, and the like by executing programs stored in the memory 1700. The processor 1300 may perform a function of the image acquisition device 1000 of FIGS. 1 through 29, by executing the programs stored in the memory 1700.

In detail, the processor 1300 may control the user input interface 1100 to receive a user input of selecting at least one of the displayed objects. The processor 1300 may control a microphone 1620 to receive a voice input of the user. The processor 1300 may execute an application that performs an operation of the image acquisition device 1000, based on a user input, and may control the user input interface to receive the user input through the executed application. For example, the processor 1300 may execute a voice assistant application and may control the A/V input interface 1600 to receive a voice input of the user through the microphone 1620 by controlling the executed voice assistant application.

The processor 1300 may control the output interface 1200 and the memory 1700 of the image acquisition device 1000 to display the first image, the indicator indicating the sub-object, and the second image. The processor 1300 may include at least one micro-chip.

The processor 1300 may detect the main object and the sub-object from the first image. The processor 1300 may detect at least one of the main object and the sub-object by using the AI neural network.

The processor 1300 may remove the sub-object from the first image and generate the second image by restoring an area of the first image from which the sub-object has been removed. The processor 1300 may remove the sub-object from the first image by using the AI neural network and restore an area of the first image from which the sub-object has been removed. In this case, the AI neural network may restore at least a portion of the main object hidden by the sub-object that is removed.

The processor 1300 may acquire information of relative locations between the camera and the main object and may restore the at least portion of the main object, based on the information of the relative locations.

The processor 1300 may perform image processing for restoring the at least portion of the main object, such that sharpness of a restored portion of the main object corresponds to sharpness of the main object within the first image. For example, the processor 1300 may determine the sharpness of at least a portion of the main object that is restored to correspond to the sharpness of the main object within the first image, and may perform image processing such that the sharpness of the restored portion of the main object corresponds to the determined sharpness.

The processor 1300 may detect a sub-object selected from the first image, based on a user input. For example, the processor 1300 may detect the appearance of each of a plurality of objects included in the first image by using the AI neural network, and may detect, as a sub-object, an object located in the vicinity of an area that has received a user input.

The processor 1300 may track a motion of the sub-object within the first image. For example, the processor 1300 may acquire information of relative locations between the camera and the sub-object and may track the motion of the sub-object by detecting a change in the information of the relative locations.

The sensing unit 1400 may sense a state of the image acquisition device 1000 or a state of the surroundings of the image acquisition device 1000 and may transmit information corresponding to the sensed state to the processor 1300.

The sensing unit 1400 may include, but is not limited thereto, at least one selected from a magnetic sensor 1410, an acceleration sensor 1420, a temperature/humidity sensor 1430, an infrared sensor 1440, a gyroscope sensor 1450, a position sensor (e.g., a GPS) 1460, a pressure sensor 1470, a proximity sensor 1480, and an RGB sensor 1490 (i.e., an illuminance sensor). Functions of most of the sensors would be instinctively understood by one of ordinary skill in the art in view of their names and thus detailed descriptions thereof will be omitted herein.

The communication interface 1500 may include at least one component that enables the image acquisition device 1000 to communicate with other devices (not shown) and the server 2000. The other device may be a computing device, such as the image acquisition device 1000, or a sensing device, and embodiments are not limited thereto. For example, the communication interface 1500 may include a short-range wireless communication interface 1510, a mobile communication interface 1520, and a broadcasting receiver 1530.

Examples of the short-range wireless communication interface 1510 may include, but are not limited to, a Bluetooth communication interface, a Bluetooth Low Energy (BLE) communication interface, a near field communication (NFC) interface, a wireless local area network (WLAN) (e.g., Wi-Fi) communication interface, a ZigBee communication interface, an infrared Data Association (IrDA) communication interface, a Wi-Fi direct (WFD) communication interface, an ultra wideband (UWB) communication interface, and an Ant+ communication interface.

The mobile communication interface 1520 may exchange a wireless signal with at least one selected from a base station, an external terminal, and a server on a mobile communication network. Here, examples of the wireless signal may include a voice call signal, a video call signal, and various types of data according to text/multimedia messages transmission.

The broadcasting receiver 1530 receives a broadcasting signal and/or broadcasting-related information from an external source via a broadcasting channel. The broadcasting channel may be a satellite channel, a ground wave channel, or the like. According to embodiments, the image acquisition device 1000 may not include the broadcasting receiver 1530.

According to an embodiment, the communication interface 1500 may transmit the first image to the server 2000.

According to an embodiment, the communication interface 1500 may receive information about a result of the detection of the main object and the sub-object from the server 2000.

According to an embodiment, the communication interface 1500 may receive, from the server 2000, a software module that implements the AI neural network.

According to an embodiment, the communication interface 1500 may receive, from the server 2000, data used to update the AI neural network.

The A/V input interface 1600 inputs an audio signal or a video signal, and may include a camera 1610 and the microphone 1620. The camera 1610 may acquire an image frame, such as a still image or a moving picture, via an image sensor in a video call mode or a photography mode. An image captured via the image sensor may be processed by the processor 1300 or a separate image processor (not shown).

The microphone 1620 receives an external audio signal and converts the external audio signal into electrical audio data. For example, the microphone 1620 may receive an audio signal from an external device or a user. The microphone 1620 may receive a voice input of the user. The microphone 1620 may use various noise removal algorithms in order to remove noise that is generated while receiving the external audio signal.

The memory 1700 may store a program used by the processor 1300 to perform processing and control, and may also store data that is input to or output from the image acquisition device 1000.

The memory 1700 may include at least one type of storage medium selected from among a flash memory type, a hard disk type, a multimedia card micro type, a card type memory (for example, a secure digital (SD) or extreme digital (XD) memory), a random access memory (RAM), a static random access memory (SRAM), a read-only memory (ROM), an electrically erasable programmable ROM (EEPROM), a programmable ROM (PROM), magnetic memory, a magnetic disk, and an optical disk.

The programs stored in the memory 1700 may be classified into a plurality of modules according to their functions, for example, a user interface (UI) module 1710, a touch screen module 1720, and a notification module 1730.

The UI module 1710 may provide a UI, graphical user interface (GUI), or the like that is specialized for each application and interoperates with the image acquisition device 1000. The touch screen module 1720 may detect a touch gesture on a touch screen of a user and transmit information regarding the touch gesture to the processor 1300. The touch screen module 1720 according to an embodiment may recognize and analyze a touch code. The touch screen module 1720 may be configured by separate hardware including a controller.

The notification module 1730 may generate a signal for notifying that an event has been generated in the image acquisition device 1000. Examples of the event generated in the image acquisition device 1000 may include call signal receiving, message receiving, a key signal input, schedule notification, and the like. The notification module 1730 may output a notification signal in the form of a video signal via the display 1210, in the form of an audio signal via the audio output interface 1220, or in the form of a vibration signal via the vibration motor 1230.

Figure 32:
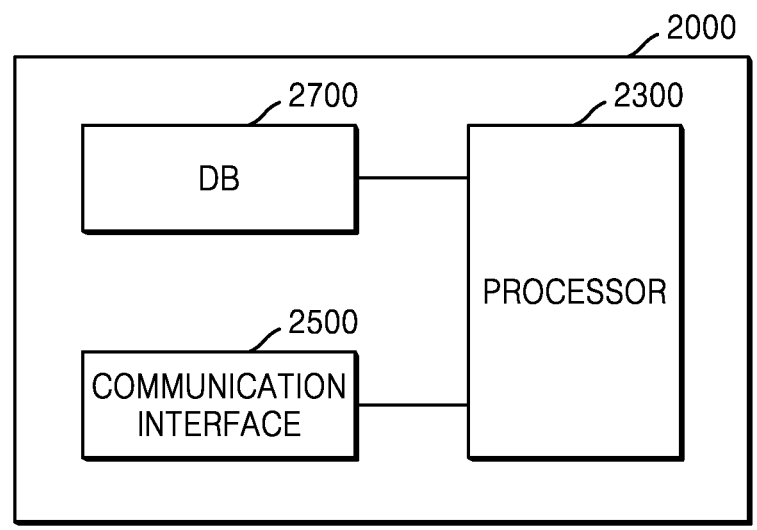
FIG. 32 is a block diagram of the server according to some embodiments.

FIG. 32 is a block diagram of the server 2000 according to some embodiments.

Referring to FIG. 32, the server 2000 may include a communication interface 2500, a database (DB) 2700, and a processor 2300.

The communication interface 2500 may include at least one component that enables the serve 2000 to communicate with the image acquisition device 1000.

The communication interface 2500 may receive or transmit an image from or to the image acquisition device 1000.

The DB 2700 may store a trained model and learning data that is applied in the trained model.

The processor 2300 typically controls an overall operation of the server 2000. For example, the processor 2300 may control the DB 2700 and the communication interface 2500 by executing the programs stored in the DB 2700 of the server 2000. The processor 2300 may perform some of the operations of the image acquisition device 1000 of FIGS. 1 through 29, by executing the programs stored in the DB 2700.

The processor 2300 may perform at least one of a function of detecting at least one of a main object and a sub-object from a first image, a function of removing, from the first image, data associated with at least some area of the first image where the sub-object is located, and a function of restoring the data-removed area such that at least a portion of the main object hidden by the sub-object is included.

The processor 2300 may manage at least one of data necessary for detecting at least one of the main object and the sub-object from the first image, data necessary for removing, from the first image, the data associated with at least some area of the first image where the sub-object is located, and data necessary for restoring the data-removed area such that at least a portion of the main object hidden by the sub-object is included.

Figure 33:
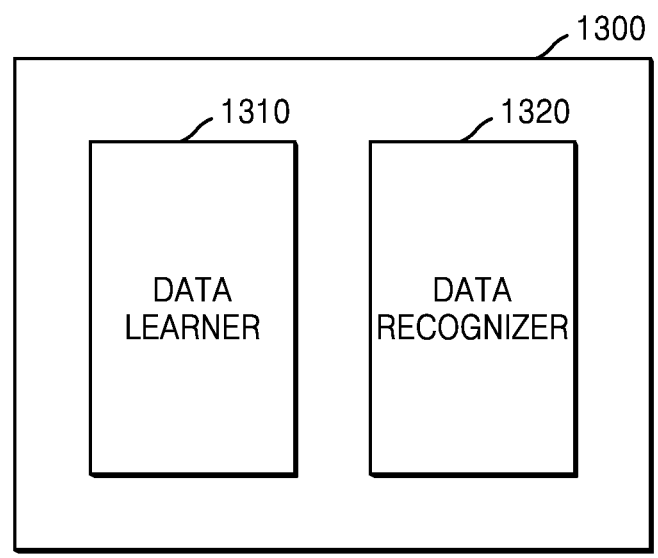
FIG. 33 is a block diagram of a processor included in the image acquisition device, according to some embodiments.

FIG. 33 is a block diagram of the processor 1300 according to some embodiments.

Referring to FIG. 33, the processor 1300 may include a data learner 1310 and a data recognizer 1320.

The data learner 1310 may learn a standard for detecting the main object and the sub-object from the first image. The data learner 1310 may learn a standard about which data is to be used in order to detect the main object and the sub-object from the first image. The data learner 1310 may learn the standard for detecting the main object and the sub-object from the first image, by obtaining data for use in learning and applying the obtained data to a data recognition model which will be described later.

The data learner 1310 may learn a standard for removing, from the first image, the data associated with at least some area of the first image where the sub-object is located. The data learner 1310 may learn a standard about which data is to be used in order to remove, from the first image, the data associated with at least some area of the first image where the sub-object is located. The data learner 1310 may learn the standard for removing, from the first image, the data associated with at least some area of the first image where the sub-object is located, by obtaining data for use in learning and applying the obtained data to the data recognition model.

The data learner 1310 may learn a standard for restoring the data-removed area such that at least a portion of the main object hidden by the sub-object is included. The data learner 1310 may learn a standard about which data is to be used in order to restore the data-removed area such that at least a portion of the main object hidden by the sub-object is included. The data learner 1310 may learn the standard for restoring the data-removed area such that at least a portion of the main object hidden by the sub-object is included, by obtaining data for use in learning and applying the obtained data to the data recognition model.

The data recognizer 1320 may detect the main object and the sub-object from the first image, based on the data. The data recognizer 1320 may detect the main object and the sub-object from the first image, based on certain data, by using the trained data recognition model. The data recognizer 1320 may detect the main object and the sub-object from the first image by obtaining the certain data according to a standard previously set due to learning and by using the data recognition model by using the obtained data as an input value. A result value output by the data recognition model by using the obtained data as an input value may be used to update the data recognition model.

The data recognizer 1320 may remove, from the first image, the data associated with at least some area of the first image where the sub-object is located, based on the data. The data recognizer 1320 may remove, from the first image, the data associated with at least some area of the first image where the sub-object is located, by using the trained data recognition model. The data recognizer 1320 may remove, from the first image, the data associated with at least some area of the first image where the sub-object is located, by obtaining certain data according to a standard previously set due to learning and by using the data recognition model by using the obtained data as an input value. A result value output by the data recognition model by using the obtained data as an input value may be used to update the data recognition model.

The data recognizer 1320 may restore the data-removed area such that at least a portion of the main object hidden by the sub-object is included. based on the data. The data recognizer 1320 may restore the data-removed area such that at least a portion of the main object hidden by the sub-object is included. by using the trained data recognition model. The data recognizer 1320 may restore the data-removed area such that at least a portion of the main object hidden by the sub-object is included, by obtaining certain data according to a standard previously set due to learning and by using the data recognition model by using the obtained data as an input value. A result value output by the data recognition model by using the obtained data as an input value may be used to update the data recognition model.

At least one of the data learner 1310 and the data recognizer 1320 may be manufactured in the form of at least one hardware chip and may be mounted on a device. For example, at least one of the data learner 1310 and the data recognizer 1320 may be manufactured in the form of a dedicated hardware chip for AI, or may be manufactured as a portion of an existing general-purpose processor (for example, a central processing unit (CPU) or an application processor (AP)) or a processor dedicated to graphics (for example, a graphics processing unit (GPU)) and may be mounted on any of the aforementioned various devices.

In this case, the data learner 1310 and the data recognizer 1320 may be both mounted on a single device, or may be respectively mounted on independent devices. For example, one of the data learner 1310 and the data recognizer 1320 may be included in the image acquisition device 1000, and the other may be included in the server 2000. The data learner 1310 and the data recognizer 1320 may be connected to each other by wire or wirelessly, and thus model information established by the data learner 1310 may be provided to the data recognizer 1320 and data input to the data recognizer 1320 may be provided as additional learning data to the data learner 1310.

At least one of the data learner 1310 and the data recognizer 1320 may be implemented as a software module. When at least one of the data learner 1310 and the data recognizer 1320 is implemented using a software module (or a program module including instructions), the software module may be stored in non-transitory computer readable media. In this case, the at least one software module may be provided by an operating system (OS) or by a certain application. Alternatively, some of the at least one software module may be provided by an OS and the others may be provided by a certain application.

Figure 34:
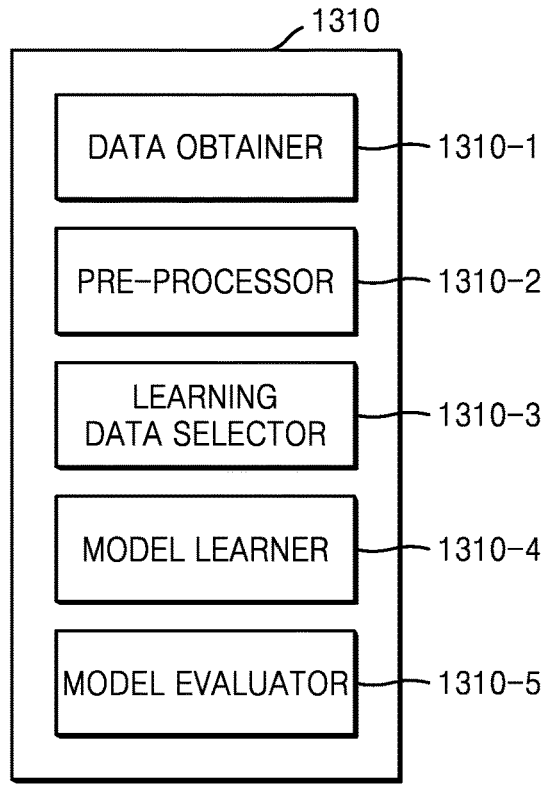
FIG. 34 is a block diagram of a data learner included in the processor, according to some embodiments.

FIG. 34 is a block diagram of the data learner 1310 according to some embodiments.

Referring to FIG. 34, the data learner 1310 may include a data obtainer 1310-1, a pre-processor 1310-2, a learning data selector 1310-3, a model learner 1310-4, and a model evaluator 1310-5.

The data obtainer 1310-1 may obtain data needed to detect the main object and the sub-object from the first image. The data obtainer 1310-1 may obtain data needed to remove, from the first image, the data associated with at least some area of the first image where the sub-object is located. The data obtainer 1310-1 may obtain data needed to restore the data-removed area such that at least a portion of the main object hidden by the sub-object is included.

The data obtainer 1310-1 may obtain at least one image stored in the image acquisition device 1000. For example, the data obtainer 1310-1 may obtain an image including the face of the user and images including the faces of people associated with the user (e.g., family members, a lover, and relatives of the user), the images stored in the image acquisition device 1000. As another example, the data obtainer 1310-1 may obtain images associated with a region where the user is located (e.g., major buildings, sculptures, and natural landscapes of the region), the images stored in the image acquisition device 1000. As another example, the data obtainer 1310-1 may obtain at least one image disclosed on the Internet (e.g., major buildings, sculptures, and natural landscapes of the region). As another example, the data obtainer 1310-1 may obtain at least one image associated with general objects (e.g., a tree, a trash can, a streetlamp, traffic lights, a stall, a human, and an animal), the at least one image disclosed on the Internet.

The pre-processor 1310-2 may pre-process the obtained data such that the obtained data may be used to detect at least one of the main object and the sub-object from the first image. The pre-processor 1310-2 may pre-process the obtained data such that the obtained data may be used to remove, from the first image, the data associated with at least some area of the first image where the sub-object is located. The pre-processor 1310-2 may pre-process the obtained data such that the obtained data may be used to restore the data-removed area such that at least a portion of the main object hidden by the sub-object is included.

The pre-processor 1310-2 may process the obtained data into a preset format such that the model learner 1310-4, which will be described later, may use the obtained data for learning for detecting at least one of the main object and the sub-object from the first image.

The learning data selector 1310-3 may select data necessary for learning from among pieces of pre-processed data. The selected data may be provided to the model learner 1310-4.

The learning data selector 1310-3 may select the data necessary for learning from among the pieces of pre-processed data, according to a preset standard for detecting at least one of the main object and the sub-object from the first image. The learning data selector 1310-3 may select the data necessary for learning from among the pieces of pre-processed data, according to a preset standard for removing, from the first image, the data associated with at least some area of the first image where the sub-object is located. The learning data selector 1310-3 may select the data necessary for learning from among the pieces of pre-processed data, according to a preset standard for restoring the data-removed area such that at least a portion of the main object hidden by the sub-object is included.

The learning data selector 1310-3 may select data according to a standard previously set due to learning by the model learner 1310-4, which will be described later.

The model learner 1310-4 may learn a standard about how to detect at least one of the main object and the sub-object from the first image, based on learning data. The model learner 1310-4 may learn a standard about how to remove, from the first image, the data associated with at least some area of the first image where the sub-object is located, based on learning data. The model learner 1310-4 may learn a standard about how to restore the data-removed area such that at least a portion of the main object hidden by the sub-object is included, based on learning data.

The model learner 1310-4 may learn a standard about which learning data is to be used in order to detect at least one of the main object and the sub-object from the first image. The model learner 1310-4 may learn a standard about which learning data is to be used in order to remove, from the first image, the data associated with at least some area of the first image where the sub-object is located. The model learner 1310-4 may learn a standard about which learning data is to be used in order to restore the data-removed area such that at least a portion of the main object hidden by the sub-object is included.

The model learner 1310-4 may train a trained model that is used to detect at least one of the main object and the sub-object from the first image, by using the learning data. The model learner 1310-4 may train a trained model that is used to remove, from the first image, the data associated with at least some area of the first image where the sub-object is located, by using the learning data. The model learner 1310-4 may train a trained model that is used to restore the data-removed area such that at least a portion of the main object hidden by the sub-object is included, by using the learning data.

In this case, the trained model may be a pre-established model. For example, the trained model may be a model previously established by receiving basic learning data (for example, sample data).

The trained model may be established considering, for example, an application field of a recognition model, a purpose of learning, or the computer performance of a device. The trained model may include, for example, a model based on a neural network. For example, a model, such as a DNN, an RNN, or a BRDNN, may be used as the trained model, but embodiments are not limited thereto.

According to various embodiments, when a plurality of trained models that are pre-established exist, the model learner 1310-4 may determine a trained model having a high relationship between input learning data and basic learning data as the trained model to be trained In this case, the basic learning data may be pre-classified according to types of data, and the trained model may be pre-established according to the types of data. For example, the basic learning data may be pre-classified according to various standards such as an area where the learning data is generated, a time for which the learning data is generated, a size of the learning data, a genre of the learning data, a generator of the learning data, and a type of the object in the learning data The model learner 1310-4 may train the trained model by using a learning algorithm including, for example, error back-propagation or gradient descent.

The model learner 1310-4 may train the trained model through supervised learning by using, for example, the learning data as an input value. The model learner 1310-4 may train the trained model through unsupervised learning to find a standard for detecting at least one of a main object and a sub-object from the first image, by detecting at least one of a main object and a sub-object without supervision and self-learning a type of data needed to provide a response operation corresponding to a result of the detection. The model learner 1310-4 may train the trained model through reinforcement learning using a feedback about whether a result of the detection of at least one of a main object and a sub-object according to learning is right.

When the trained model is trained, the model learner 1310-4 may store the trained model. In this case, the model learner 1310-4 may store the trained model in a memory of a device including the data recognizer 1320. Alternatively, the model learner 1310-4 may store the trained model in a memory of a server that is connected with the device via a wired or wireless network.

In this case, the memory in which the trained model is stored may also store, for example, a command or data related with at least one other component of the device. The memory may also store software and/or a program. The program may include, for example, a kernel, a middleware, an application programming interface (API), and/or an application program (or an application).

When the model evaluator 1310-5 inputs evaluation data to the trained model and a recognition result that is output from the evaluation data does not satisfy a predetermined standard, the model evaluator 1310-5 may enable the model learner 1310-4 to learn again. In this case, the evaluation data may be preset data for evaluating the trained model.

For example, when the number or percentage of pieces of evaluation data that provide inaccurate recognition results from among recognition results of the trained model with respect to the evaluation data exceeds a preset threshold, the model evaluator 1310-5 may evaluate that the predetermined standard is not satisfied. For example, when the predetermined standard is defined as 2% and the trained model outputs wrong recognition results for more than 20 pieces of evaluation data from among a total of 1000 pieces of evaluation data, the model evaluator 1310-5 may evaluate that the trained model is not appropriate.

When there are a plurality of trained models, the model evaluator 1310-5 may evaluate whether each of the plurality of trained models satisfies the predetermined standard, and may determine, as a final trained model, a trained model that satisfies the predetermined standard. In this case, when a plurality of trained models satisfy the predetermined standard, the model evaluator 1310-5 may determine one or a predetermined number of trained models that are preset in a descending order of evaluation scores as final trained models.

At least one of the data obtainer 1310-1, the pre-processor 1310-2, the learning data selector 1310-3, the model learner 1310-4, and the model evaluator 1310-5 in the data learner 1310 may be manufactured in the form of at least one hardware chip and may be mounted on a device. For example, at least one of the data obtainer 1310-1, the pre-processor 1310-2, the learning data selector 1310-3, the model learner 1310-4, and the model evaluator 1310-5 may be manufactured in the form of a dedicated hardware chip for AI, or may be manufactured as a portion of an existing general-purpose processor (for example, a CPU or an AP) or a processor dedicated to graphics (for example, a GPU) and may be mounted on any of the aforementioned various devices.

The data obtainer 1310-1, the pre-processor 1310-2, the learning data selector 1310-3, the model learner 1310-4, and the model evaluator 1310-5 may be all mounted on a single device, or may be respectively mounted on independent devices. For example, some of the data obtainer 1310-1, the pre-processor 1310-2, the learning data selector 1310-3, the model learner 1310-4, and the model evaluator 1310-5 may be included in a device, and the others may be included in a server.

For example, at least one of the data obtainer 1310-1, the pre-processor 1310-2, the learning data selector 1310-3, the model learner 1310-4, and the model evaluator 1310-5 may be implemented as a software module. When at least one of the data obtainer 1310-1, the pre-processor 1310-2, the learning data selector 1310-3, the model learner 1310-4, and the model evaluator 1310-5 is implemented as a software module (or a program module including instructions), the software module may be stored in a non-transitory computer-readable recording medium. In this case, the at least one software module may be provided by an OS or by a certain application. Alternatively, some of the at least one software module may be provided by an OS and the others may be provided by a certain application.

The processor 1300 may use various trained models, and may efficiently learn a standard for generating at least one of a main object and a sub-object from the first image according to various methods via the various trained models.

Figure 35:
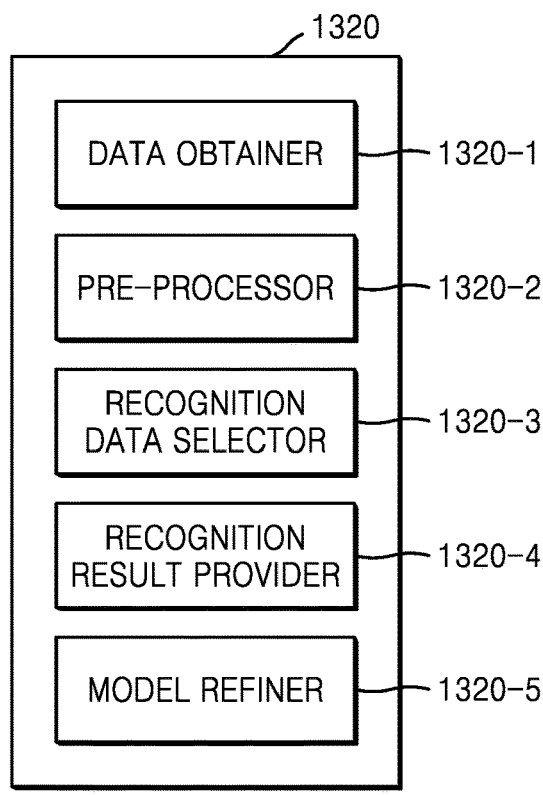
FIG. 35 is a block diagram of a data recognizer included in the processor, according to some embodiments.

FIG. 35 is a block diagram of the data recognizer 1320 according to some embodiments.

Referring to FIG. 35, the data recognizer 1320 may include a data obtainer 1320-1, a pre-processor 1320-2, a recognition data selector 1320-3, a recognition result provider 1320-4, and a model refiner 1320-5.

The data obtainer 1320-1 may obtain data needed to detect the main object and the sub-object from the first image. The data obtainer 1320-1 may obtain data needed to remove, from the first image, the data associated with at least some area of the first image where the sub-object is located. The data obtainer 1320-1 may obtain data needed to restore the data-removed area such that at least a portion of the main object hidden by the sub-object is included.

The pre-processor 1310-2 may pre-process the obtained data such that the obtained data may be used to detect at least one of the main object and the sub-object from the first image. The pre-processor 1310-2 may pre-process the obtained data such that the obtained data may be used to remove, from the first image, the data associated with at least some area of the first image where the sub-object is located. The pre-processor 1310-2 may pre-process the obtained data such that the obtained data may be used to restore the data-removed area such that at least a portion of the main object hidden by the sub-object is included.

The pre-processor 1320-2 may process the obtained data into a preset format such that the recognition result provider 1320-4, which will be described later, may use the data obtained to detect at least one of the main object and the sub-object from the first image. The pre-processor 1320-2 may pre-process the obtained data into a preset format such that the recognition result provider 1320-4 may use the data obtained to remove, from the first image, the data associated with at least some area of the first image where the sub-object is located.

The recognition data selector 1320-3 may select data needed to detect at least one of the main object and the sub-object from the first image, from among pieces of pre-processed data. The recognition data selector 1320-3 may select data needed to remove, from the first image, the data associated with at least some area of the first image where the sub-object is located, from among the pieces of pre-processed data. The recognition data selector 1320-3 may select data needed to restore the data-removed area such that at least a portion of the main object hidden by the sub-object is included, from among the pieces of pre-processed data. The selected data may be provided to the recognition result provider 1320-4.

The recognition data selector 1320-3 may select some or all of the pieces of pre-processed data, according to a preset standard for detecting at least one of the main object and the sub-object from the first image. The recognition data selector 1320-3 may select some or all of the pieces of pre-processed data, according to a preset standard for removing, from the first image, the data associated with at least some area of the first image where the sub-object is located. The recognition data selector 1320-3 may select some or all of the pieces of pre-processed data, according to a preset standard for restoring the data-removed area such that at least a portion of the main object hidden by the sub-object is included.

The recognition data selector 1320-3 may select data according to a standard previously set due to learning by the model learner 1310-4, which will be described later.

The recognition result provider 1320-4 may detect at least one of the main object and the sub-object from the first image, by applying the selected data to a data recognition model. The recognition result provider 1320-4 may remove, from the first image, the data associated with at least some area of the first image where the sub-object is located, by applying the selected data to the data recognition model. The recognition result provider 1320-4 may restore the data-removed area such that at least a portion of the main object hidden by the sub-object is included. by applying the selected data to the data recognition model.

The recognition result provider 1320-4 may provide a recognition result that conforms to a data recognition purpose. The recognition result provider 1320-4 may apply the selected data to the data recognition model by using the data selected by the recognition data selector 1320-3 as an input value. The recognition result may be determined by the data recognition model. For example, a recognition result of detecting at least one of the main object and the sub-object from the first image, a recognition result of removing, from the first image, the data associated with at least some area of the first image where the sub-object is located, and a recognition result of restoring the data-removed area such that at least a portion of the main object hidden by the sub-object is included may be provided as text, an image, or instructions (e.g., application execution instructions or module function execution instructions).

The model refiner 1320-5 may enable the data recognition model to be updated, based on an evaluation of a recognition result provided by the recognition result provider 1320-4. For example, the model refiner 1320-5 may enable the model learner 1310-4 to update the data recognition model, by providing the recognition result provided by the recognition result provider 1320-4 to the model learner 1310-4.

At least one of the data obtainer 1320-1, the pre-processor 1320-2, the recognition data selector 1320-3, the recognition result provider 1320-4, and the model refiner 1320-5 within the data recognizer 1320 may be manufactured in the form of at least one hardware chip and may be mounted on a device. For example, at least one of the data obtainer 1320-1, the pre-processor 1320-2, the recognition data selector 1320-3, the recognition result provider 1320-4, and the model refiner 1320-5 may be manufactured in the form of a dedicated hardware chip for AI, or may be manufactured as a portion of an existing general-purpose processor (for example, a CPU or an AP) or a processor dedicated to graphics (for example, a GPU) and may be mounted on any of the aforementioned various devices.

The data obtainer 1320-1, the pre-processor 1320-2, the recognition data selector 1320-3, the recognition result provider 1320-4, and the model refiner 1320-5 may be all mounted on a single electronic apparatus, or may be respectively mounted on independent electronic apparatuses. For example, some of the data obtainer 1320-1, the pre-processor 1320-2, the recognition data selector 1320-3, the recognition result provider 1320-4, and the model refiner 1320-5 may be included in an electronic apparatus, and the others may be included in a server.

At least one of the data obtainer 1320-1, the pre-processor 1320-2, the recognition data selector 1320-3, the recognition result provider 1320-4, and the model refiner 1320-5 may be implemented as a software module. When at least one of the data obtainer 1320-1, the pre-processor 1320-2, the recognition data selector 1320-3, the recognition result provider 1320-4, and the model refiner 1320-5 is implemented as a software module (or a program module including instructions), the software module may be stored in a non-transitory computer-readable recording medium. In this case, the at least one software module may be provided by an OS or by a certain application. Alternatively, some of the at least one software module may be provided by an OS and the others may be provided by a certain application.

The image acquisition device 1000 may provide the user with an image that conforms to an intention of the user by using a trained model to which a learned result has been applied.

Figure 36:
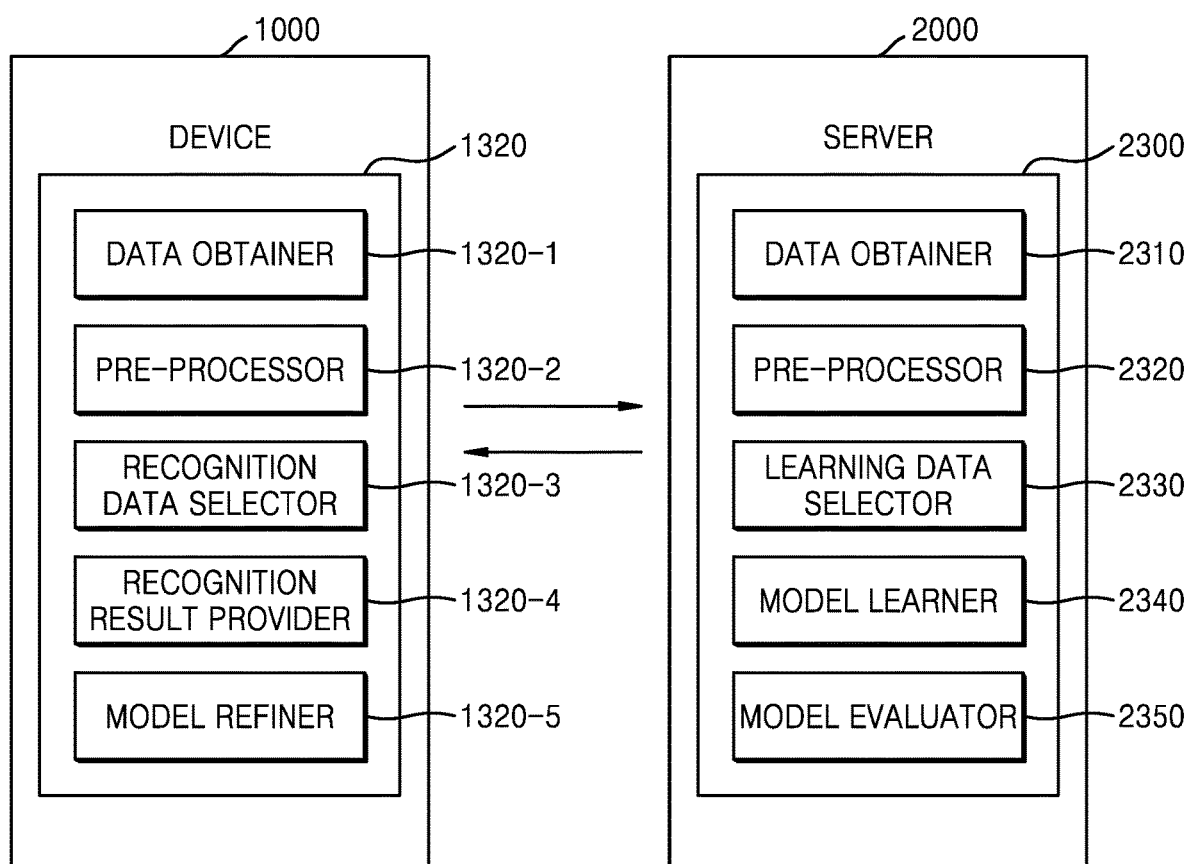
FIG. 36 is a block diagram illustrating an example where the image acquisition device and the server interoperate to learn and recognize data, according to some embodiments.

FIG. 36 is a block diagram illustrating an example where the image acquisition device 1000 and the server 2000 interoperate to learn and recognize data, according to some embodiments.

Referring to FIG. 36, the server 2000 may learn a standard for detecting at least one of the main object and the sub-object from the first image, a standard for removing, from the first image, the data associated with at least some area of the first image where the sub-object is located, and a standard for restoring the data-removed area such that at least a portion of the main object hidden by the sub-object is included, and the image acquisition device 1000 may detect at least one of the main object and the sub-object from the first image, remove, from the first image, the data associated with at least some area of the first image where the sub-object is located, and restore the data-removed area such that at least a portion of the main object hidden by the sub-object is included, based on a learning result of the server 2000.

In this case, a model learner 2340 of the server 2000 may perform a function of the data learner 1310 of FIG. 33. The model learner 2340 of the server 2000 may learn the standard for detecting the main object and the sub-object from the first image. The model learner 2340 may learn a standard about which data is to be used in order to detect the main object and the sub-object from the first image. The model learner 2340 may learn the standard for detecting the main object and the sub-object from the first image, by obtaining data for use in learning and applying the obtained data to a data recognition model which will be described later.

The model learner 2340 may learn the standard for removing, from the first image, the data associated with at least some area of the first image where the sub-object is located. The model learner 2340 may learn a standard about which data is to be used in order to remove, from the first image, the data associated with at least some area of the first image where the sub-object is located. The model learner 2340 may learn the standard for removing, from the first image, the data associated with at least some area of the first image where the sub-object is located, by obtaining data for use in learning and applying the obtained data to the data recognition model which will be described later.

The model learner 2340 may learn the standard for restoring the data-removed area such that at least a portion of the main object hidden by the sub-object is included. The model learner 2340 may learn a standard about which data is to be used in order to restore the data-removed area such that at least a portion of the main object hidden by the sub-object is included. The model learner 2340 may learn the standard for restoring the data-removed area such that at least a portion of the main object hidden by the sub-object is included, by obtaining data for use in learning and applying the obtained data to the data recognition model which will be described later.

The model learner 2340 may learn at least one of the standard for detecting at least one of the main object and the sub-object from the first image, the standard for removing, from the first image, the data associated with at least some area of the first image where the sub-object is located, and the standard for restoring the data-removed area such that at least a portion of the main object hidden by the sub-object is included, by obtaining data for use in learning and applying the obtained data to a trained model which will be described later.

The recognition result provider 1320-4 of the image acquisition device 1000 may detect at least one of the main object and the sub-object from the first image, remove, from the first image, data associated with at least some area of the first image where the sub-object is located, and restore the data-removed area such that at least a portion of the main object hidden by the sub-object is included, by applying the data selected by the recognition data selector 1320-3 to the data recognition model generated by the server 2000. For example, the recognition result provider 1320-4 may transmit the data selected by the recognition data selector 1320-3 to the server 2000, and the server 2000 may request to detect at least one of the main object and the sub-object from the first image, remove, from the first image, the data associated with at least some area of the first image where the sub-object is located, and restore the data-removed area such that at least a portion of the main object hidden by the sub-object is included, by applying the data selected by the recognition data selector 1320-3 to a recognition model.

The recognition result provider 1320-4 may receive, from the server 2000, information about a method of detecting at least one of the main object and the sub-object from the first image, removing, from the first image, the data associated with at least some area of the first image where the sub-object is located, and restoring the data-removed area such that at least a portion of the main object hidden by the sub-object is included.

Alternatively, the recognition result provider 1320-4 of the image acquisition device 1000 may receive the recognition model generated by the server 2000 from the server 2000, and may detect at least one of the main object and the sub-object from the first image by using the received recognition model. The recognition result provider 1320-4 may remove, from the first image, the data associated with at least some area of the first image where the sub-object is located, and restore the data-removed area such that at least a portion of the main object hidden by the sub-object is included, by using the received recognition model. In this case, the recognition result provider 1320-4 of the image acquisition device 1000 may detect at least one of the main object and the sub-object from the first image, remove, from the first image, the data associated with at least some area of the first image where the sub-object is located, and restore the data-removed area such that at least a portion of the main object hidden by the sub-object is included, by applying the data selected by the recognition data selector 1320-3 to the recognition model received from the server 2000.

The various units of the image acquisition device 1000 may be implemented by a combination of a processor, memory, and program code located in the memory and executed by the processor to perform the various functions of the methods and devices described above.

The various units of the server 2000 may be implemented by a combination of a processor, memory, and program code located in the memory and executed by the processor to perform the various functions of the methods and devices described above.

The image acquisition device 1000 and the server 2000 may effectively distribute and perform operations for learning of a trained model and data recognition, and accordingly efficiently perform data processing in order to provide a service that is consistent with a user's intention, and effectively protect user's privacy.

Some embodiments may also be embodied as a storage medium including instruction codes executable by a computer such as a program module executed by the computer. A computer readable medium can be any available medium which can be accessed by the computer and includes all volatile/non-volatile and removable/non-removable media. Further, the computer readable medium may include all computer storage and communication media. The computer storage medium includes all volatile/non-volatile and removable/non-removable media embodied by a certain method or technology for storing information such as computer readable instruction code, a data structure, a program module or other data.

The terminology "unit" used herein may be a hardware component such as a processor or a circuit, and/or a software component that is executed by a hardware component such as a processor.

Although the embodiments of the present disclosure have been disclosed for illustrative purposes, one of ordinary skill in the art will appreciate that diverse variations and modifications are possible, without departing from the spirit and scope of the disclosure. Thus, the above embodiments should be understood not to be restrictive but to be illustrative, in all aspects. For example, respective elements described in an integrated form may be dividedly used, and the divided elements may be used in a state of being combined.

While one or more example embodiments have been described with reference to the figures, it will be understood by those of ordinary skill in the art that various changes in form and details may be made therein without departing from the spirit and scope as defined by the following claims.

What is claimed is:

1. A method of providing an image, the method comprising:
acquiring, via a camera of an image acquisition device, a first image including a plurality of objects;
receiving an input selecting an area of the first image;
detecting an object, based on the selected area, from among the plurality of objects using a first trained model;
generating a second image including image data to replace data associated with an area corresponding to the detected object with other data by using a second trained model; and
displaying the second image using a display of the image acquisition device,
wherein a first size of the selected area is different from a second size of the area corresponding to the detected object, and
wherein the first trained model is different from the second trained model.

2. The method of claim 1, wherein the detected object is a human.

3. The method of claim 1, wherein the first trained model is trained to identify at least one object for removing from a given image.

4. The method of claim 3, wherein the first trained model is configured to detect a main object and a sub-object in the first image.

5. The method of claim 1, wherein the second trained model is trained to restore data corresponding to an area obscured by the detected object.

6. The method of claim 1, wherein the generating the second image comprises removing data associated with the detected object.

7. The method of claim 6, wherein the data is removed using a third trained model, the third trained model being trained to remove data associated with an area where a sub-object is located.

8. The method of claim 1, wherein the generating the second image comprises replacing the data associated with the area corresponding to the detected object included in the first image with data corresponding to an area of background hidden by the detected object.

9. The method of claim 1, further comprising, based on the detecting of the object, displaying an indicator indicating the detected object.

10. The method of claim 9, wherein the displaying the indicator comprises displaying the detected object overlaid with at least one of a preset color and a preset pattern.

11. The method of claim 1, wherein the generating the second image comprises generating a portion of another object hidden by the detected object.

12. The method of claim 1, wherein the second trained model comprises a generative artificial intelligence (AI) model.

13. An image acquisition device comprising:
a display;
a camera;
at least one processor; and
memory configured to store instructions which, when executed by the at least one processor, cause the image acquisition device to:
control the camera to acquire a first image including a plurality of objects;
receive an input selecting an area of the first image;
detect an object, based on the selected area, from among the plurality of objects using a first trained model;
generate a second image including image data to replace data associated with an area corresponding to the detected object with other data by using a second trained model; and
control the display to display the second image,
wherein a first size of the selected area is different from a second size of the area corresponding to the detected object, and
wherein the first trained model is different from the second trained model.

14. The image acquisition device of claim 13, wherein the detected object is a human.

15. The image acquisition device of claim 13,
wherein the first trained model is trained to identify at least one object for removing from a given image, and
wherein the first trained model detect a main object and a sub-object in the first image.

16. The image acquisition device of claim 13, wherein the second trained model is trained to restore data corresponding to an area obscured by the detected object.

17. The image acquisition device of claim 13, wherein the instructions further cause the image acquisition device to:
remove data associated with the detected object using a third trained model, the third trained model being trained to remove data associated with an area where a sub-object is located.

* * * * *